(12) United States Patent
Moore et al.

(10) Patent No.: US 7,181,463 B2
(45) Date of Patent: Feb. 20, 2007

(54) SYSTEM AND METHOD FOR MANAGING DATA USING STATIC LISTS

(75) Inventors: Jason F. Moore, Redmond, WA (US); Richard Malcolm Banks, Egham (GB); Cornelis K. van Dok, Bellevue, WA (US); David G. De Vorchik, Seattle, WA (US); Timothy P. McKee, Seattle, WA (US); Walter R. Smith, Seattle, WA (US); Chris J. Guzak, Kirkland, WA (US); Relja Ivanovic, Redmond, WA (US); Jeffrey C. Belt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 131 days.

(21) Appl. No.: 10/693,666

(22) Filed: Oct. 24, 2003

(65) Prior Publication Data

US 2005/0091235 A1    Apr. 28, 2005

(51) Int. Cl.
G06F 7/00 (2006.01)
G06F 15/00 (2006.01)

(52) U.S. Cl. .................. 707/102; 707/100; 707/101; 707/104.1; 715/526; 715/810; 715/866

(58) Field of Classification Search ..... 707/100–104.1, 707/10, 204; 715/513, 526, 810, 8; 705/14
See application file for complete search history.

(56) References Cited

U.S. PATENT DOCUMENTS

| | | | |
|---|---|---|---|
| 5,241,671 A | 8/1993 | Reed et al. | |
| 5,333,315 A | 7/1994 | Saether et al. | |
| 5,388,196 A | 2/1995 | Pajak et al. | |
| 5,499,364 A | 3/1996 | Klein et al. | |

(Continued)

FOREIGN PATENT DOCUMENTS

CN    1421800    11/2001

(Continued)

OTHER PUBLICATIONS

Feng et al.—"Schemata Transformation of Object-Oriented Conceptual Models to XML"—Computer Systems Science & Engineering, vol. 18, No. 1, Jan. 2003 (pp. 45-60).*

(Continued)

*Primary Examiner*—John Breene
*Assistant Examiner*—Anh Ly
(74) *Attorney, Agent, or Firm*—Banner & Witcoff, Ltd.

(57) ABSTRACT

A method and system are provided in which static lists facilitate arbitrary grouping of items of data independent of their locations and in ways that are meaningful to the user. A static list is a set of items defined by a root item, a direction, and the entry relationships with that root item in that direction. The static list also defines the properties that each entry relationship in the list is required to have. Verbs are provided to manage a static list. A verb is an action that may be performed on the items in the static list, and includes, among others, move, copy, add, remove, and delete. A view is provided to specify characteristics for displaying data from a static list, including visibility, order, and formatting, among other characteristics.

23 Claims, 19 Drawing Sheets

U.S. PATENT DOCUMENTS

| | | | |
|---|---|---|---|
| 5,504,852 A | 4/1996 | Thompson-Rohrlich | |
| 5,513,306 A | 4/1996 | Mills et al. | |
| 5,630,042 A | 5/1997 | McIntosh et al. | |
| 5,680,563 A | 10/1997 | Edelman | |
| 5,696,486 A | 12/1997 | Poliquin et al. | |
| 5,757,925 A | 5/1998 | Faybishenko | |
| 5,790,121 A | 8/1998 | Sklar et al. | |
| 5,802,516 A | 9/1998 | Shwarts et al. | |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,875,446 A | 2/1999 | Brown et al. | |
| 5,878,410 A | 3/1999 | Zbikowski et al. | |
| 5,899,995 A | 5/1999 | Millier et al. | |
| 5,929,854 A | 7/1999 | Ross | |
| 5,933,139 A | 8/1999 | Feigner et al. | |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,021,262 A | 2/2000 | Cote et al. | |
| 6,025,843 A | 2/2000 | Sklar | |
| 6,037,944 A * | 3/2000 | Hugh | 715/854 |
| 6,061,692 A | 5/2000 | Thomas et al. | |
| 6,061,695 A | 5/2000 | Slivka et al. | |
| 6,078,924 A | 6/2000 | Ainsbury et al. | |
| 6,097,389 A | 8/2000 | Morris et al. | |
| 6,144,968 A | 11/2000 | Zellweger | |
| 6,147,601 A | 11/2000 | Sandelman et al. | |
| 6,181,342 B1 | 1/2001 | Niblack | |
| 6,202,061 B1 | 3/2001 | Khosla et al. | |
| 6,237,011 B1 | 5/2001 | Ferguson et al. | |
| 6,240,421 B1 | 5/2001 | Stolarz | |
| 6,243,094 B1 | 6/2001 | Sklar | |
| 6,243,724 B1 * | 6/2001 | Mander et al. | 715/526 |
| 6,256,031 B1 | 7/2001 | Meijer et al. | |
| 6,275,829 B1 | 8/2001 | Angiulo et al. | |
| 6,317,142 B1 | 11/2001 | Decoste et al. | |
| 6,324,551 B1 | 11/2001 | Lamping et al. | |
| 6,339,767 B1 | 1/2002 | Rivette et al. | |
| 6,341,280 B1 | 1/2002 | Glass et al. | |
| 6,363,377 B1 | 3/2002 | Kravets et al. | |
| 6,401,097 B1 | 6/2002 | McCotter et al. | |
| 6,411,311 B1 | 6/2002 | Rich et al. | |
| 6,430,575 B1 | 8/2002 | Dourish et al. | |
| 6,453,311 B1 | 9/2002 | Powers, III | |
| 6,466,238 B1 | 10/2002 | Berry et al. | |
| 6,480,835 B1 | 11/2002 | Light | |
| 6,505,233 B1 | 1/2003 | Hanson et al. | |
| 6,513,038 B1 | 1/2003 | Hasegawa et al. | |
| 6,526,399 B1 | 2/2003 | Coulson et al. | |
| 6,535,229 B1 | 3/2003 | Kraft | |
| 6,539,399 B1 | 3/2003 | Hazama et al. | |
| 6,549,217 B1 | 4/2003 | De Greef et al. | |
| 6,549,916 B1 * | 4/2003 | Sedlar | 707/101 |
| 6,573,907 B1 * | 6/2003 | Madrane | 715/513 |
| 6,583,799 B1 | 6/2003 | Manolis et al. | |
| 6,590,585 B1 | 7/2003 | Suzuki et al. | |
| 6,613,101 B2 | 9/2003 | Mander et al. | |
| 6,636,238 B1 | 10/2003 | Amir et al. | |
| 6,636,250 B1 * | 10/2003 | Gasser | 715/853 |
| 6,684,222 B1 * | 1/2004 | Cornelius et al. | 707/104.1 |
| 6,738,770 B2 | 5/2004 | Gorman | |
| 6,745,206 B2 | 6/2004 | Mandler et al. | |
| 6,754,829 B1 | 6/2004 | Butt et al. | |
| 6,762,776 B2 | 7/2004 | Huapaya | |
| 6,768,999 B2 | 7/2004 | Prager et al. | |
| 6,795,094 B1 * | 9/2004 | Watanabe et al. | 715/762 |
| 6,801,919 B2 | 10/2004 | Hunt et al. | |
| 6,803,926 B1 | 10/2004 | Lamb et al. | |
| 6,823,344 B1 | 11/2004 | Isensee et al. | |
| 6,847,959 B1 | 1/2005 | Arrouye et al. | |
| 6,853,391 B2 | 2/2005 | Bates et al. | |
| 6,865,568 B2 | 3/2005 | Chau | |
| 6,876,996 B2 | 4/2005 | Czajkowski et al. | |
| 6,880,132 B2 | 4/2005 | Uemura | |
| 6,883,146 B2 * | 4/2005 | Prabhu et al. | 715/854 |
| 6,906,722 B2 | 6/2005 | Hrebejk et al. | |
| 6,922,709 B2 | 7/2005 | Goodman | |
| 6,944,647 B2 | 9/2005 | Shah et al. | |
| 6,980,993 B2 | 12/2005 | Horvitz et al. | |
| 7,068,291 B1 | 6/2006 | Roberts et al. | |
| 2001/0034771 A1 | 10/2001 | Hutsch et al. | |
| 2001/0047368 A1 * | 11/2001 | Oshinsky et al. | 707/204 |
| 2001/0049675 A1 | 12/2001 | Mandler et al. | |
| 2001/0053996 A1 * | 12/2001 | Atkinson | 705/14 |
| 2001/0056434 A1 | 12/2001 | Kaplan et al. | |
| 2002/0019935 A1 | 2/2002 | Andrew et al. | |
| 2002/0033844 A1 | 3/2002 | Levy et al. | |
| 2002/0049717 A1 | 4/2002 | Routtenberg et al. | |
| 2002/0054167 A1 | 5/2002 | Hugh | |
| 2002/0059199 A1 | 5/2002 | Harvey | |
| 2002/0062310 A1 | 5/2002 | Marmor et al. | |
| 2002/0075310 A1 | 6/2002 | Prabhu et al. | |
| 2002/0075312 A1 | 6/2002 | Amadio et al. | |
| 2002/0075330 A1 | 6/2002 | Rosenzweig et al. | |
| 2002/0087969 A1 | 7/2002 | Brunheroto et al. | |
| 2002/0089540 A1 | 7/2002 | Geler et al. | |
| 2002/0091679 A1 | 7/2002 | Wright | |
| 2002/0091697 A1 | 7/2002 | Huang et al. | |
| 2002/0091739 A1 | 7/2002 | Ferlitsch et al. | |
| 2002/0095416 A1 | 7/2002 | Schwols | |
| 2002/0097278 A1 | 7/2002 | Mandler et al. | |
| 2002/0104069 A1 | 8/2002 | Gouge et al. | |
| 2002/0107973 A1 | 8/2002 | Lennon et al. | |
| 2002/0111942 A1 | 8/2002 | Campbell et al. | |
| 2002/0113821 A1 | 8/2002 | Hrebejk et al. | |
| 2002/0120505 A1 | 8/2002 | Henkin et al. | |
| 2002/0138582 A1 | 9/2002 | Chandra et al. | |
| 2002/0152262 A1 | 10/2002 | Arkin et al. | |
| 2002/0152267 A1 | 10/2002 | Lennon | |
| 2002/0156895 A1 | 10/2002 | Brown | |
| 2002/0161800 A1 | 10/2002 | Eld et al. | |
| 2002/0163572 A1 | 11/2002 | Center et al. | |
| 2002/0169678 A1 * | 11/2002 | Chao et al. | 705/26 |
| 2002/0196276 A1 | 12/2002 | Corl et al. | |
| 2003/0009484 A1 | 1/2003 | Hamanaka et al. | |
| 2003/0018657 A1 | 1/2003 | Monday | |
| 2003/0069908 A1 * | 4/2003 | Anthony et al. | 707/513 |
| 2003/0074356 A1 | 4/2003 | Kaier et al. | |
| 2003/0093321 A1 * | 5/2003 | Bodmer et al. | 705/26 |
| 2003/0093531 A1 | 5/2003 | Yeung et al. | |
| 2003/0101200 A1 | 5/2003 | Koyama et al. | |
| 2003/0105745 A1 * | 6/2003 | Davidson et al. | 707/3 |
| 2003/0110188 A1 | 6/2003 | Howard et al. | |
| 2003/0115218 A1 | 6/2003 | Bobbitt et al. | |
| 2003/0117422 A1 | 6/2003 | Hiyama et al. | |
| 2003/0122873 A1 | 7/2003 | Dieberger et al. | |
| 2003/0126136 A1 | 7/2003 | Omoigui | |
| 2003/0126212 A1 | 7/2003 | Morris et al. | |
| 2003/0135495 A1 | 7/2003 | Vagnozzi | |
| 2003/0135517 A1 * | 7/2003 | Kauffman | 707/103 R |
| 2003/0135659 A1 | 7/2003 | Bellotti et al. | |
| 2003/0140115 A1 | 7/2003 | Mehra | |
| 2003/0154185 A1 * | 8/2003 | Suzuki et al. | 707/1 |
| 2003/0177422 A1 | 9/2003 | Tararoukhine et al. | |
| 2003/0210281 A1 | 11/2003 | Ellis et al. | |
| 2003/0212710 A1 | 11/2003 | Guy | |
| 2003/0225796 A1 | 12/2003 | Matsubara | |
| 2003/0227487 A1 * | 12/2003 | Hugh | 345/777 |
| 2003/0233419 A1 | 12/2003 | Beringer | |
| 2004/0001106 A1 | 1/2004 | Deutscher et al. | |

| | | |
|---|---|---|
| 2004/0002993 A1 | 1/2004 | Toussaint et al. |
| 2004/0019655 A1 | 1/2004 | Uemura et al. |
| 2004/0030731 A1 | 2/2004 | Iftode et al. |
| 2004/0044696 A1* | 3/2004 | Frost .......................... 707/200 |
| 2004/0044776 A1 | 3/2004 | Larkin |
| 2004/0054674 A1 | 3/2004 | Carpenter et al. |
| 2004/0070612 A1 | 4/2004 | Sinclair et al. |
| 2004/0083433 A1* | 4/2004 | Takeya ....................... 715/530 |
| 2004/0085581 A1 | 5/2004 | Tonkin |
| 2004/0088374 A1 | 5/2004 | Webb et al. |
| 2004/0091175 A1 | 5/2004 | Beyrouti |
| 2004/0098370 A1 | 5/2004 | Garland et al. |
| 2004/0098379 A1 | 5/2004 | Huang |
| 2004/0098742 A1 | 5/2004 | Hsieh et al. |
| 2004/0103280 A1 | 5/2004 | Balfanz et al. |
| 2004/0117358 A1 | 6/2004 | Von Kaenel et al. |
| 2004/0133572 A1 | 7/2004 | Bailey et al. |
| 2004/0133588 A1 | 7/2004 | Kiessig et al. |
| 2004/0148434 A1 | 7/2004 | Matsubara et al. |
| 2004/0153451 A1 | 8/2004 | Phillips et al. |
| 2004/0153968 A1 | 8/2004 | Ching et al. |
| 2004/0167942 A1* | 8/2004 | Oshinsky et al. ........... 707/204 |
| 2001/0193594 | 9/2004 | Moore et al. |
| 2004/0177319 A1 | 9/2004 | Horn |
| 2004/0183824 A1 | 9/2004 | Benson et al. |
| 2004/0189704 A1 | 9/2004 | Walsh et al. |
| 2004/0189707 A1 | 9/2004 | Moore et al. |
| 2004/0193600 A1 | 9/2004 | Kaasten et al. |
| 2004/0193621 A1 | 9/2004 | Moore et al. |
| 2004/0193672 A1 | 9/2004 | Samji et al. |
| 2004/0193673 A1 | 9/2004 | Samji et al. |
| 2004/0199507 A1 | 10/2004 | Tawa |
| 2004/0205168 A1 | 10/2004 | Asher |
| 2004/0205625 A1 | 10/2004 | Banatwala et al. |
| 2004/0205633 A1 | 10/2004 | Martinez et al. |
| 2004/0215600 A1 | 10/2004 | Aridor et al. |
| 2004/0220899 A1 | 11/2004 | Barney et al. |
| 2004/0223057 A1 | 11/2004 | Oura et al. |
| 2004/0225650 A1 | 11/2004 | Cooper et al. |
| 2004/0230572 A1 | 11/2004 | Omoigui |
| 2004/0230599 A1 | 11/2004 | Moore et al. |
| 2004/0230917 A1 | 11/2004 | Bales et al. |
| 2004/0249902 A1 | 12/2004 | Tadayon et al. |
| 2005/0010860 A1 | 1/2005 | Weiss et al. |
| 2005/0015405 A1 | 1/2005 | Plastina et al. |
| 2005/0027757 A1* | 2/2005 | Kiessig et al. .............. 707/204 |
| 2005/0050470 A1 | 3/2005 | Hudson et al. |
| 2005/0055306 A1 | 3/2005 | Miller et al. |
| 2005/0080807 A1* | 4/2005 | Beilinson et al. ........... 707/102 |
| 2005/0192953 A1 | 9/2005 | Neale et al. |
| 2005/0246331 A1 | 11/2005 | De Vorchik et al. |
| 2005/0246664 A1 | 11/2005 | Michelman et al. |
| 2005/0257169 A1 | 11/2005 | Tu |
| 2005/0283476 A1 | 12/2005 | Kaasten et al. |
| 2006/0004692 A1 | 1/2006 | Kaasten et al. |
| 2006/0020586 A1 | 1/2006 | Prompt et al. |
| 2006/0036568 A1 | 2/2006 | Moore et al. |
| 2006/0200466 A1 | 9/2006 | Kaasten et al. |

FOREIGN PATENT DOCUMENTS

| | | |
|---|---|---|
| GB | 2329492 | 3/1999 |
| WO | 01/63919 A1 | 8/2001 |
| WO | WO 0225420 | 3/2002 |
| WO | WO 2004107151 | 9/2004 |

OTHER PUBLICATIONS

Feng, L., et al., "Schemata Transformation of Object-Oriented Conceptual Models to XML," *Computer Systems Science & Engineering* 18(1):45-60, 2003.

Joseph, M., "The UML for Data Modellers," *Elektron*, Apr. 2004, pp. 72-73.

Wang, G., and M. Liu, "Extending XML Schema With Nonmonotonic Inheritance," in M.A. Jeusfeld and Ó. Pastor (eds.), *ER 2003 Workshops, Lecture Notes in Computer Science* 2814:402-407, 2003.

A.T. McCray, et al., Extending the Role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and its Use Recording and Analysis of User Events," *Proceedings of the 35th Annual Hawaii International Conference on System Sciences*, IEEE Computer Society, Big Island, Hawaii, Jan. 7-10, 2002, p. 1862-1867.

"About Managing Messages With Rules", Microsoft® Outlook® 2003 Help file, 3 pp.

"Trillian/Trillian Pro IM Clients" Products Description, © 1999-2004 Cerulean Studios, <http://www.ceruleanstudios.com> [retrieved Apr. 30, 2004].

International Search Report of WO2004/097638 A1 (McKee, et al.) dated Nov. 11, 2004.

Microsoft Windows XP Version 2002 (Screen Dumps, Figs. 1-16).

Simpson, Alan, Windows 95 Uncut, 1995, IDG Books Worldwide, Inc., pp. 104-107.

Adobe, Inc., et al., "Adobe Photoshop CS Classroom in a Book," Dec. 1, 2003, pp. 1-29.

Adobe, Inc., et al., "Adobe Photoshop 7.0", 2001; pp. 1-9.

Heinlein, et al., "Integration of Message Passing and Shared Memory in the Stanford FLASH Multiprocessor, Architectural Support for Programming Languages and Operating Systems," pp. 38-50, published 1994.

Louis, et al., "Context Learning Can Improve User Interaction Information Reuse and Integration," Proceedings of the 2004 IEEE International Conference on, pp. 115-120, Nov. 8-10, 2004.

Cohen, et al., "A Case for Associative Peer to Peer Overlays" -ACM SIGCOMM Computer Communications Review, vol. 33, No. 1, Jan. 2003, pp. 95-100.

Lui, et al., "Interoperability of Peer-to-Peer File Sharing Protocols" -ACM SIGecom Exchanges, vol. 3, No. 3, Aug. 2002, pp. 25-33.

Lee, J., "An End-User Perspective on File-Sharing Systems," Communications of the ACM 46(2):49-53, Feb. 2003.

Ohtani, A., et al., "A File Sharing Method For Storing Area Network and Its Performance Verification," NEC Res. & Develop. 44(1):85-90, Jan. 2003.

H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.

Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.

R. Rao, et al., "Rich Interaction in the Digital Library," Communications of the ACM 38(4):29-39. 1995.

Piernas, J., et al., "DualFS: A New Journaling File System Without Meta-Data Duplication," Conference Proceedings of the 2002 International Conference on SUPERCOMPUTING, New York, Jun. 22-26, 2002, p. 137-146.

Manber, U., and S. Wu, "GLIMPSE: A Tool to Search Through Entire File Systems," Proceedings of USENIX Winter 1994 Conference, San Francisco, Ca, Jan. 17-21, 1994.

Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.

Gifford, D.K., et al., "Semantic File Systems," Proceedings of the 13th ACM Symposium on Operating Systems Principles, Pacific Grove CA., Sep. 1991, pp. 16-25.

Blair, C., and G.E. Monahan, "Optimal Sequential File Search: A Reduced-State Dynamic Programming Approach," European Journal of Operational Research 86(2):358-365, 1995.

Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.

Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedorngs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

"Predefined Properties" http://help.sap.comisaphelp—ep50sp5/helpdata/en/la/9a4a3b80f2ec40aa7456bc87a94259/content.htm.

"Info Vision Infonnation Management System" http://66.1 02. 7.1 04/search?q=cache:m IXV6K6sQOQJ:www.amlib.netlproducts/infovision.htm+customised+multi+property+file+navigation &hl=en.

"Previewing Files in the Common Dialog" http://www .elitevb.comicontentiO 1,0084,0 II.

"TdcFolderListView component" http://www.appcontrols.comlmanualsldiskcontrols/index.html?tdcfolderlistview.htm.

"Previewing Files" http://developer.apple.comldocumentation/QuickTimeIINMAC/QT/iqMovieToolbox.1a.htm.

"Text File Previewer 2.0 Beta" http://www .freedownloadscenter.comlUtilitieslText- ViewerslText- File ]reviewer.html.

"Your Next OS: Windows 2006?" http://www.pcworld.comlnewsiarticle/O,aid,II3'631,OO.asp.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28, 2005; 2 pages.

"Common Dialog Box Library," downloaded from <http://msdn.microsoft.com>; date of first publication prior to Mar. 28, 2005; 8 pages.

"OPENFILENAME Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0 pp. 105-118, Available:http://www.microsoft.com/products/imaging/guides/SuiteManual.pdf, Apr. 30, 2004.

"Using Tags to Organize Your Photos.", Adobe Photoshop Album 2.0 Tutorial, Available:http://www.adobe.com/digitalimag/tips/phsaltaggin/pdfs/phsaltaggin.pdf, Apr. 30, 2004.

Examples of dialogs user Interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.

Windows Forms: Exploiting Windows Longhorn "Features from Within Your Application" (CLI 391); downloaded from http://msdn.

microsoft.com/longhorn/pdcmaterials/pdctalksavalon/>; date of first publication prior to Mar. 31, 2005; 27 pages.

MessageBox Function; downloaded from <http://msdn.microsoft.com>; date of first publication prior to Mar. 31, 2005; 4 pages.

Creating and Installing Theme Files; downloaded from <http://msdn.microsoft.com>; date of first publication prior to Feb. 21, 2005; 4 pages.

"MessageBox Function"; downloaded from <http://msdn.microsoft.com>; date of first publication prior to Mar. 31, 2005; 4 pages.

"Creating and Installing Theme Files"; downloaded from <http://msdn.microsoft.com>; date of first publication prior to Feb. 21, 2005; 4 pages.

"About Dialog Boxes"; downloaded from <http://msdn.microsoft.com>; date of first publication prior to Feb. 21, 2005; 10 pages.

"Property Sheets and Inspectors"; downloaded from <http://msdn.microsoft.com>; date of first publication prior to Feb. 21, 2005; 6 pages.

"PROPSHEETPAGE"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"DRAWITEMSTRUCT Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn.microsoft.com>; date of first publication prior to Feb. 25, 2005; 5 pages.

"Using Dialog Boxes"; downloaded from <http://msdn.microsoft.com>; date of first publication prior to Mar. 31, 2005; 8 pages.

"CreatePropertySheetPage Function"; downloaded from <http://msdn.microsoft.com>; date of first publication prior to Mar. 31, 2005; 1 page.

"DestroyPropertySheetPage Function"; downloaded from <http://msdn.microsoft.com>; date of first publication prior to Mar. 31, 2005; 1 page.

"PropertySheet Function"; downloaded from <http://msdn.microsoft.com>; date of first publication prior to Mar. 31, 2005; 2 pages.

"PropSheetPageProc Function"; downloaded from <http://msdn.microsoft.com>; date of first publication prior to Mar. 31, 2005; 2 pages.

"PropSheetProc Function"; downloaded from <http://msdn.microsoft.com>; date of first publication prior to Mar. 31, 2005; 2 pages.

"PSN_KILLACTIVE Notification"; downloaded from <http://msdn.microsoft.com>; date of first publication prior to Mar. 31, 2005; 1 page.

"PSN_QUERYCANCEL Notification"; downloaded from <http://msdn.microsoft.com>; date of first publication prior to Mar. 31, 2005; 1 page.

"PSN_RESET Notification"; downloaded from <http://msdn.microsoft.com>; date of first publication prior to Mar. 31, 2005; 1 page.

"PSN_SETACTIVE Notification"; downloaded from <http://msdn.microsoft.com>; date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSN_WIZBACK Notification"; downloaded from <http://msdn.microsoft.com>; date of first publication prior to Mar. 31, 2005; 3 pages.

"PSN_WIZFINISH Notification"; downloaded from <http://msdn.microsoft.com>; date of first publication prior to Mar. 31, 2005; 1 page.

"PSN_WIZNEXT Notification"; downloaded from <http://msdn.microsoft.com>; date of first publication prior to Mar. 31, 2005; 3 pages.

"PSM_ADDPAGE Message"; downloaded from <http://msdn.microsoft.com>; date of first publication prior to Mar. 31, 2005; 2 pages.

"PSM_IDTOINDEX Message"; downloaded from <http://msdn.microsoft.com>; date of first publication prior to Mar. 31, 2005; 1 page.

"PSM_INDEXTOHWND Message"; downloaded from <http://msdn.microsoft.com>; date of first publication prior to Mar. 31, 2005; 1 page.

"PSM_INDEXTOID Message"; downloaded from <http://msdn.microsoft.com>; date of first publication prior to Mar. 31, 2005; 1 page.

"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.

"PSM_PRESSBUTTON Message"; downloaded from <http://msdn.microsoft.com>; date of first publication prior to Mar. 31, 2005; 1 page.

"PSM_QUERYSIBLINGS Message"; downloaded from <http://msdn.microsoft.com>; date of first publication prior to Mar. 31, 2005; 1 page.

"PSM_SETCURSEL Message"; downloaded from <http://msdn.microsoft.com>; date of first publication prior to Mar. 31, 2005; 1 page.

"PSM_SETCURSELID Message"; downloaded from <http://msdn.microsoft.com>; date of first publication prior to Mar. 31, 2005; 1 page.

"PSM_SETFINISHTEXT Message"; downloaded from <http://msdn.microsoft.com>; date of first publication prior to Mar. 31, 2005; 1 page.

"PSM_SETHEADERTITLE Message"; downloaded from <http://msdn.microsoft.com>; date of first publication prior to Mar. 31, 2005; 1 page.

"PSM_SETWIZBUTTONS Message"; downloaded from <http://msdn.microsoft.com;22 ; date of first publication prior to Mar. 31, 2005; 2 pages.

"PROPSHEETHEADER Structure"; downloaded from <http://msdn.microsoft.com>; date of first publication prior to Mar. 31, 2005; 5 pages.

"PROPSHEETPAGE Structure"; downloaded from <http://msdn.microsoft.com>; date of first publication prior to Mar. 31, 2005; 4 pages.

"PSHNOTIFY Structure"; downloaded from <http://msdn.microsoft.com>; date of first publication prior to Mar. 31, 2005; 1 page.

"BCM_GETIDEALSIZE Message"; downloaded from <http://msdn.microsoft.com>; date of first publication prior to Mar. 31, 2005; 1 page.

"PSM_SETTITLE Message"; downloaded from <http://msdn.microsoft.com>; date of first publication prior to Mar. 31, 2005; 1 page.

Microsoft Press Pass, "Windows XP is Here!", New York, Oct. 25, 2001.

Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.

McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.

Stanek R. William, "Microsoft Windows XP Professional Administrator's Pocket Consultant", Sep. 25, 2001; Microsoft Press, Chapter 9, printed pp. 1-8.

Shah, Sarju, "Windows XP Preview", FiringSquad, May 4, 2001, online, printed pp. 1-5; Figure: Hi-Res Image Viewer.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>; Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org.web/20030207145141/www.ghisler.com/featurel.htm> (Feb. 7, 2003) and <http://web.archive.org/web/20021017022627/www.ghisler.com/addons.htm> (Oct. 17, 2002), 7 pages.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Wikipedia, File Allocation Table, 2006, <http://en.wikipedia.org/wiki/File_Allocation_Table>.

* cited by examiner

SYSTEM AND METHOD FOR MANAGING DATA USING STATIC LISTS

FIELD OF THE INVENTION

In general, the present invention relates to data storage systems and, in particular, to systems and methods for managing data using static lists.

BACKGROUND OF THE INVENTION

As the use of electronic media to store text, music, pictures, and other types of data grows and the restrictions on data storage capacities lessen, computer users find themselves faced with enormous numbers of files to manage. Conventional file systems, such as those based on a file allocation table, or FAT file system, can make management of files difficult. For example, the traditional directory access to files that is provided with conventional file systems assumes that the users wishes to maintain their files in a hierarchical directory tree. However, besides being location dependent, a hierarchical organization may not be the most advantageous way to access the files from the user's point of view.

In the context of the Windows® operating system user interface, one technique for making access to files easier is the shortcut. A shortcut that provides a link to a file may be created on the desktop or in a folder, and is a quick way to start a program or open a file or folder without having to go to its permanent location. But shortcuts may not be reliable since they are not updated to reflect changes in the location or status of the underlying file. For example, moving the file to a different directory results in an error when accessing the shortcut.

Another technique for making access to files easier is the playlist. Media players offer users playlists as a way to organize certain types of files for later playback. For example, in the Windows Media Player®, the playlist contains references to music files for playback through the media player in a designated order. But playlists suffer from the same drawback as shortcuts in that the references in the playlist are not updated to reflect changes in the location or status of the underlying files. If a music file is moved or deleted, the user must hunt through all of his or her playlists to update or remove the outdated references.

Both the shortcut and playlist model of accessing files are further limited by their inability to provide to the user with alternative ways to access items other than through another folder, or in a certain order.

SUMMARY OF THE INVENTION

To overcome the above-described problems, a system, method, and computer-accessible medium for managing data using static lists are provided. Static lists facilitate arbitrary grouping of items of data independent of their locations and in ways that are meaningful to the user.

In accordance with one aspect of the present invention, a static list is a set of items defined by a root item, a direction, and the entry relationships with that root item in that direction. The items in the set are determined by following the entry relationships with the root item. The direction is either to or from the root item, depending on whether the root item is the target or the source of the entry relationship. The static list also defines the properties that each entry relationship in the list is required to have.

In accordance with another aspect of the present invention, verbs are provided to manage a static list. A verb is an action that may be performed on the items in the static list, and includes, among others, move, copy, add, remove, and delete. The actions performed on the items include actions performed on the entry relationships between the item and the root item.

In accordance with a further aspect of the present invention, a view is provided to specify characteristics for displaying data from a static list, including visibility, order, and formatting, among other characteristics.

In accordance with yet another aspect of the present invention, using static lists, the user is able to propagate certain security attributes to the items in the list so that others may access them via the list. The user may also add other information to the list as metadata to enhance the usefulness of the list and the items contained therein.

In accordance with a still further aspect of the present invention, using static lists, each item in the list is automatically managed so that the references to the data are always valid, even when the location, status, or other characteristic of the data changes.

In accordance with yet other aspects of the present invention, a computer accessible medium for managing data using static lists is provided. The computer accessible medium comprises data and computer executable components to create and manage static lists. The data defines the static list and the items contained therein. The computer executable components are capable of performing actions generally consistent with the above-described method.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following discussion is intended to provide a brief, general description of a computing system suitable for implementing various features of the invention. While the computing system will be described in the general context of a personal computer usable in a distributed computing environment, where complementary tasks are performed by remote computing devices linked together through a communication network, those skilled in the art will appreciate that the invention may be practiced with many other computer system configurations, including multiprocessor systems, minicomputers, mainframe computers, and the like. In addition to the more conventional computer systems described above, those skilled in the art will recognize that the invention may be practiced on other computing devices, including laptop computers, tablet computers, personal digital assistants (PDAs), and other devices upon which computer software or other digital content is installed.

While aspects of the invention may be described in terms of programs executed by applications in conjunction with a personal computer, those skilled in the art will recognize that those aspects also may be implemented in combination with other program modules. Generally, program modules include routines, programs, components, data structures, etc., which perform particular tasks or implement particular abstract data types.

Figure 1:
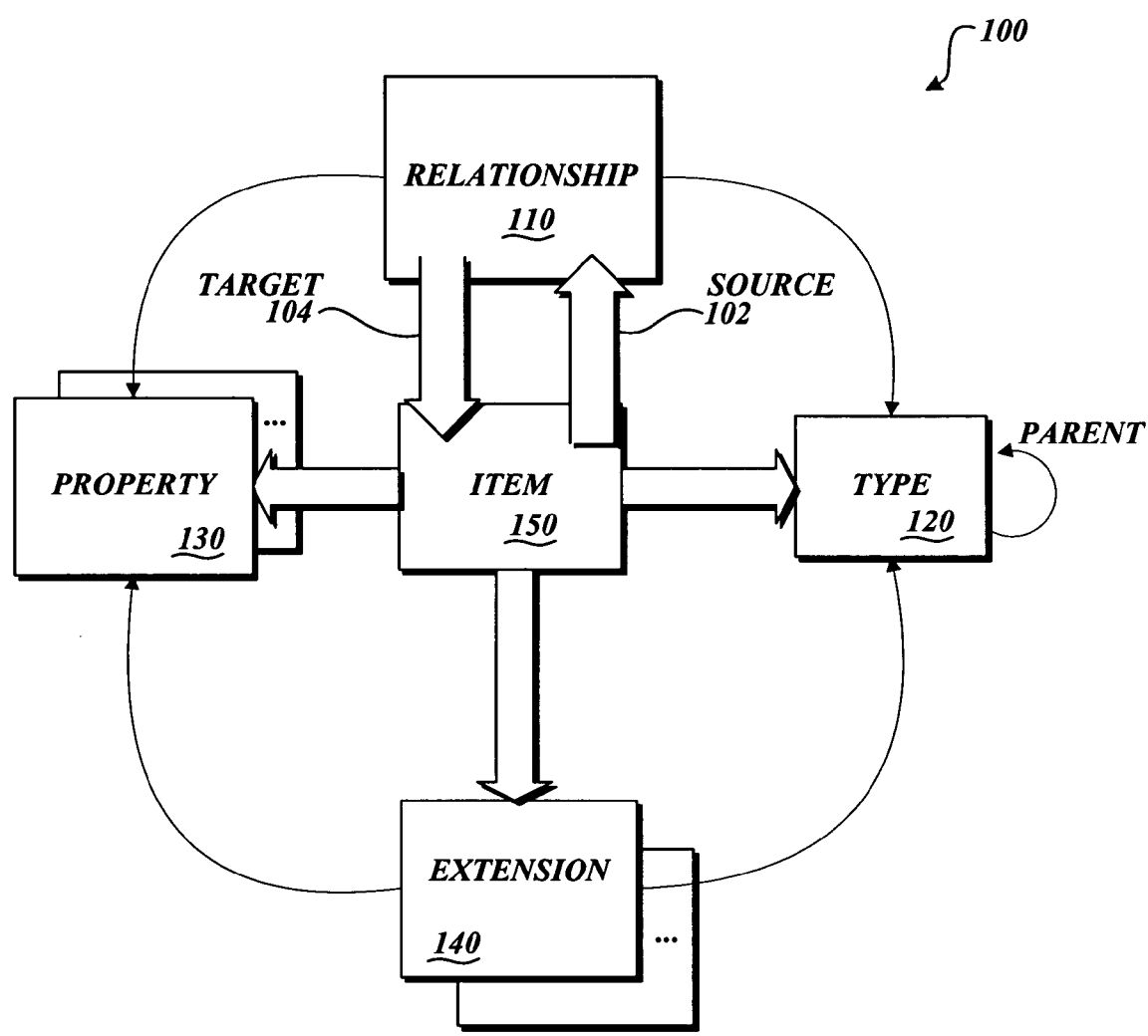
FIG. 1 is a depiction of a conceptual storage model for managing data using static lists, formed in accordance with the present invention.

FIG. 1 is a depiction of a conceptual storage model for managing data using static lists formed in accordance with the present invention. An item 150 is a primary container of data. Each item contains multiple properties 130 to hold the data, and a reference to a type 120 that defines what properties the item has. An item 150 may contain additional properties 130 that are not defined by the item's type 120.

A relationship 110 is an association between two items. Each relationship refers to two items 150 called a source 102 or a target 104, depending on direction of the relationship 110. Source items 102 originate the relationship 110, and target items 104 receive the relationship 110.

An extension 140 is similar to an item 150, in that it contains properties 130 defined by a type 120. But extensions 140 are associated with exactly one item 150 and have different types 120.

The type 120 defines the structure of an item 150, relationship 110, or extension 140 by defining its properties. Since types 120 can be used with items, relationships, or extensions, they are commonly referred to as item types, relationship types, or extension types.

Figure 2:
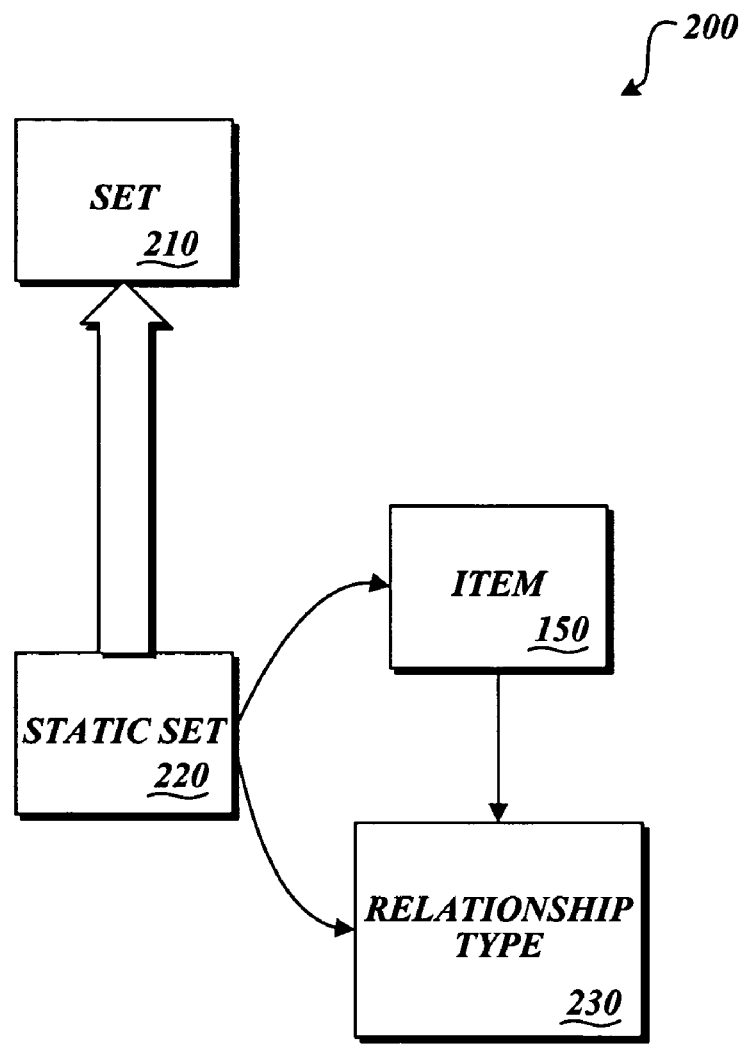
FIG. 2 is a depiction of further aspects of the conceptual storage model for defining a static set, formed in accordance with the present invention.

FIG. 2 is a depiction of further aspects of the conceptual storage model for defining a static set formed in accordance with the present invention. Specifically, FIG. 2 depicts a static set 220. As illustrated, a static set 220 is a set 210 that explicitly associates an item 150 with other items using relationship types 230. A static set 220 contains a root item 150, a relationship type 230, and a particular direction of the root item to the associated items, either a target direction 104 or a source 102 direction. The static set's membership is determined by following relationships of the given type that have the root item as either the source or the target, depending on the direction specified in the set.

Any combination of an item 150, a relationship type 230, and a direction 102/104 determines a static set 220. For example, the set of authors of a document can be found by following author relationships from the document root item, as can the set of document authored by a person by following the same relationship in the other direction.

Figure 3:
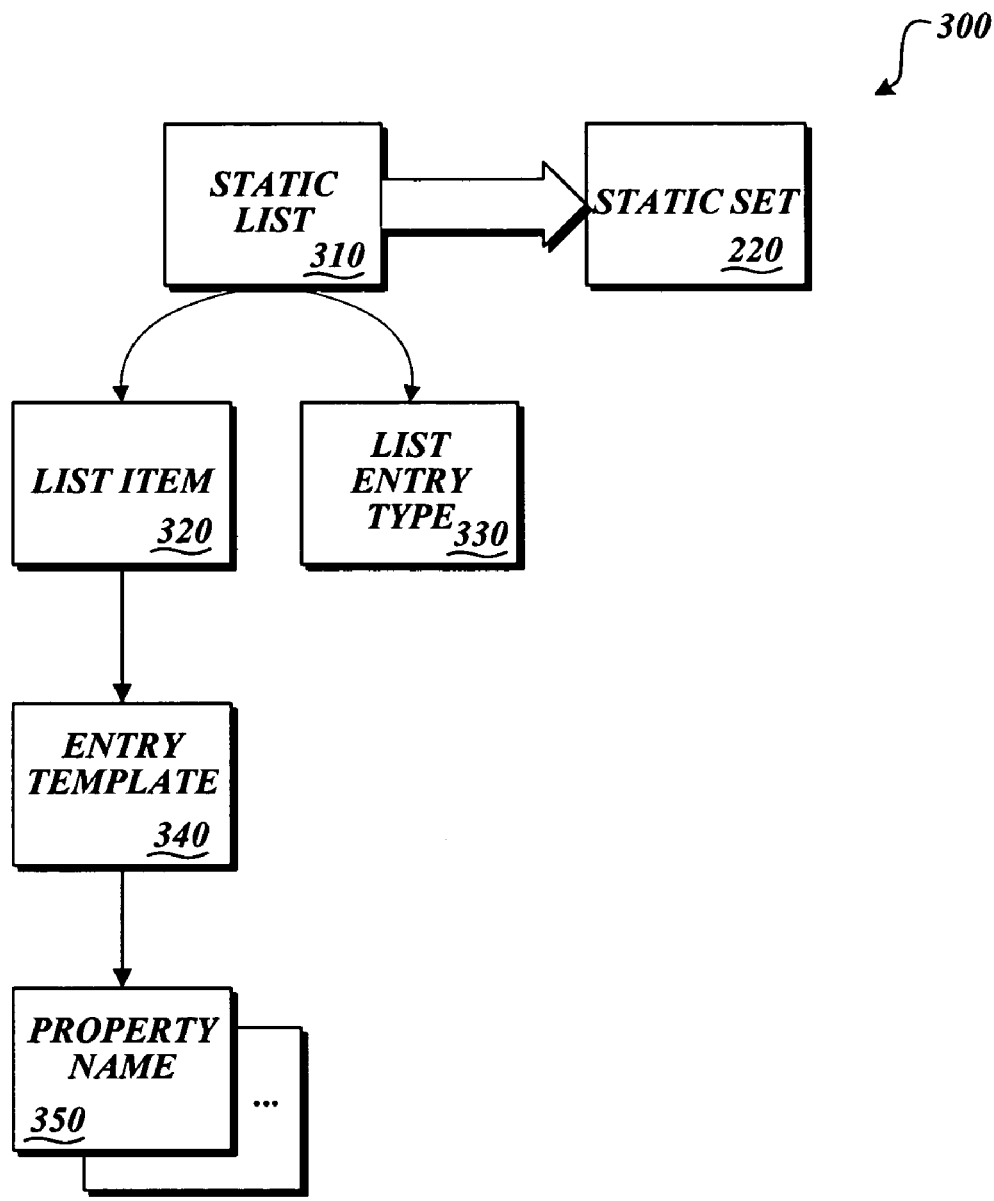
FIG. 3 is a depiction of further aspects of the conceptual storage model for defining a static list, formed in accordance with the present invention.

FIG. 3 is a depiction of further aspects of the conceptual storage model for defining a static list formed in accordance with the present invention. A static list 310 is a type of static set 220 that allows users to organize items 150 into collections in arbitrary ways. The static list 310 comprises a list item 320 and a list entry relationship type 330. The list item 320 is the root item and the list entry relationship type 330 defines the set of properties 130 and direction 102/104 that each relationship 110 in the list must have in an entry template 340 that specifies property names 350 for each of the properties 130. Because each relationship 110 has the same properties 130, the static list 310 can be thought of as a table or grid where each entry relationship 110 is a row, and each property 130 is a column, an example of which is described below with reference to FIGS. 5 and 6.

Figure 4:
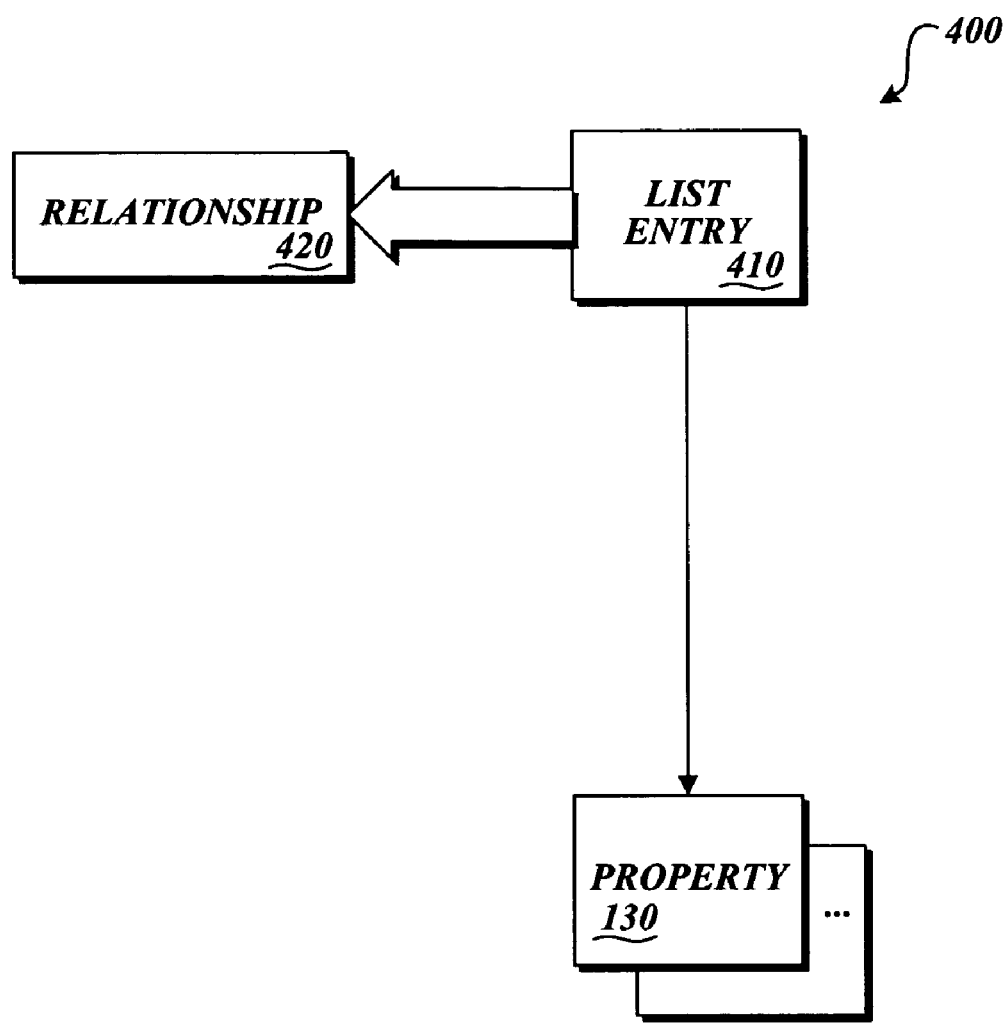
FIG. 4 is a depiction of further aspects of the conceptual storage model for defining a list entry in a static list, formed in accordance with the present invention.
Figure 5:
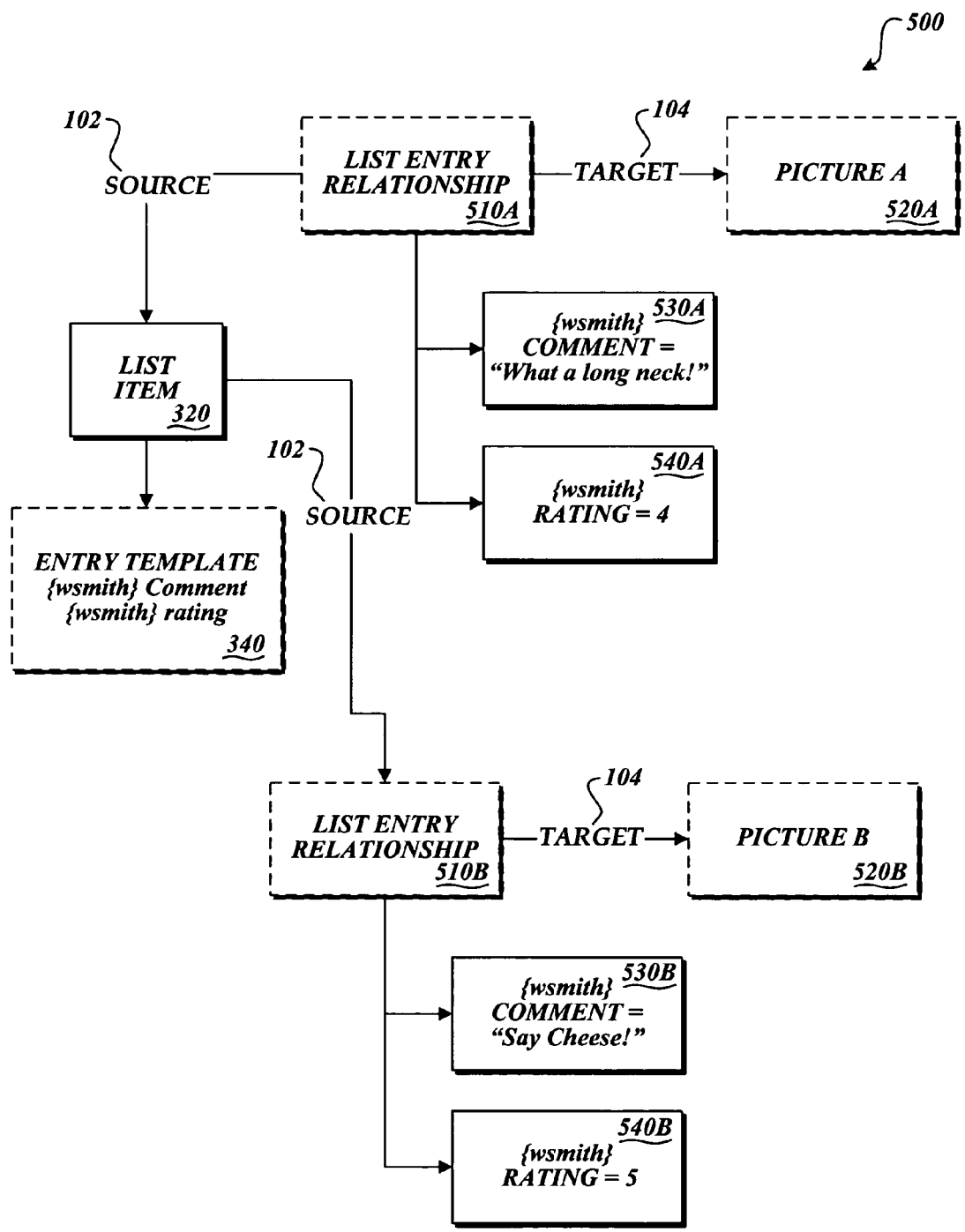
FIG. 5 is a depiction of further aspects of the conceptual storage model for defining an exemplary static list, formed in accordance with the present invention.

FIG. 4 is a depiction of further aspects of the conceptual storage model for defining a list entry in a static list formed in accordance with the present invention. Specifically, a list entry 410 is a relationship 110 that has one or more properties 130. FIG. 5 is a depiction of further aspects of the conceptual storage model for defining an exemplary static list formed in accordance with the present invention. The list item 320 that is the root item of the static list 310 is the source 102 of two list entry relationships 510A and 510B that associate the list item 320 with target items picture A 520A, and picture B 520B. Each relationship 510A and 510B has two properties 530 and 540, as defined in entry template 340. Properties 530A and 530B are comments to the referenced pictures—picture A 520A and picture B 520B—having respective values "What a long neck!" and "Say Cheese!" Properties 540A and 540B are ratings of the referenced pictures—picture A 520A and picture B 520B—having respective values "4" and "5."

Figure 6:
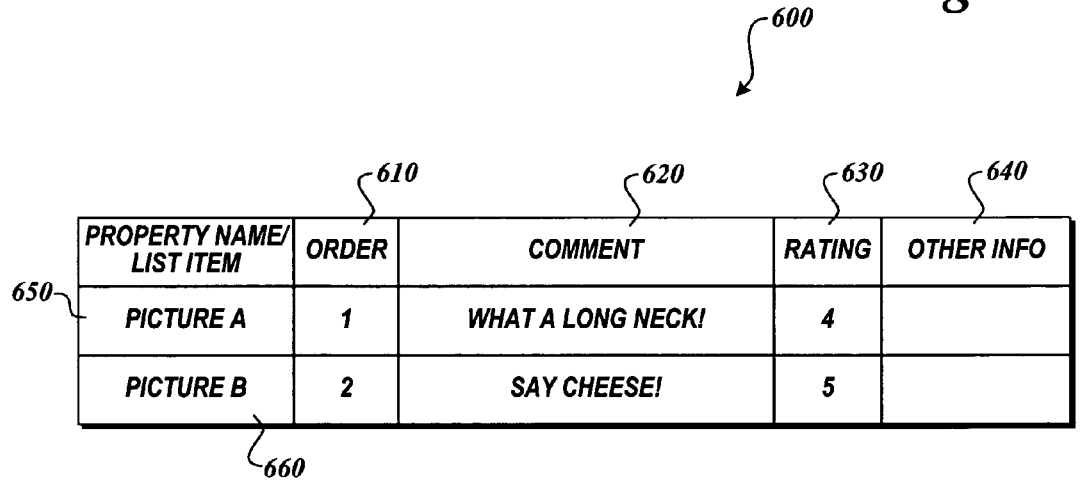
FIG. 6 is a depiction of a grid containing values for property names and list items depicted in the exemplary static list in FIG. 5.

FIG. 6 is a depiction of a grid containing values for property names and list items depicted in the exemplary static list in FIG. 5. As shown, the list items 320 comprising picture A 650 and picture B 660 form the rows of the grid 600, and the property names 350 associated with those list items 320 are the columns of the grid 600. The property names 350 are based on the entry template 340, and in the illustrated example, are comment 620 and rating 630, as previously described. Other property names 350 may be added as well, such as order 610, specifying the order in which the list items 320 should be presented in a display, and any other info 640 that the user might deem useful for items of this type (e.g., where or when the picture was taken).

Figure 7:
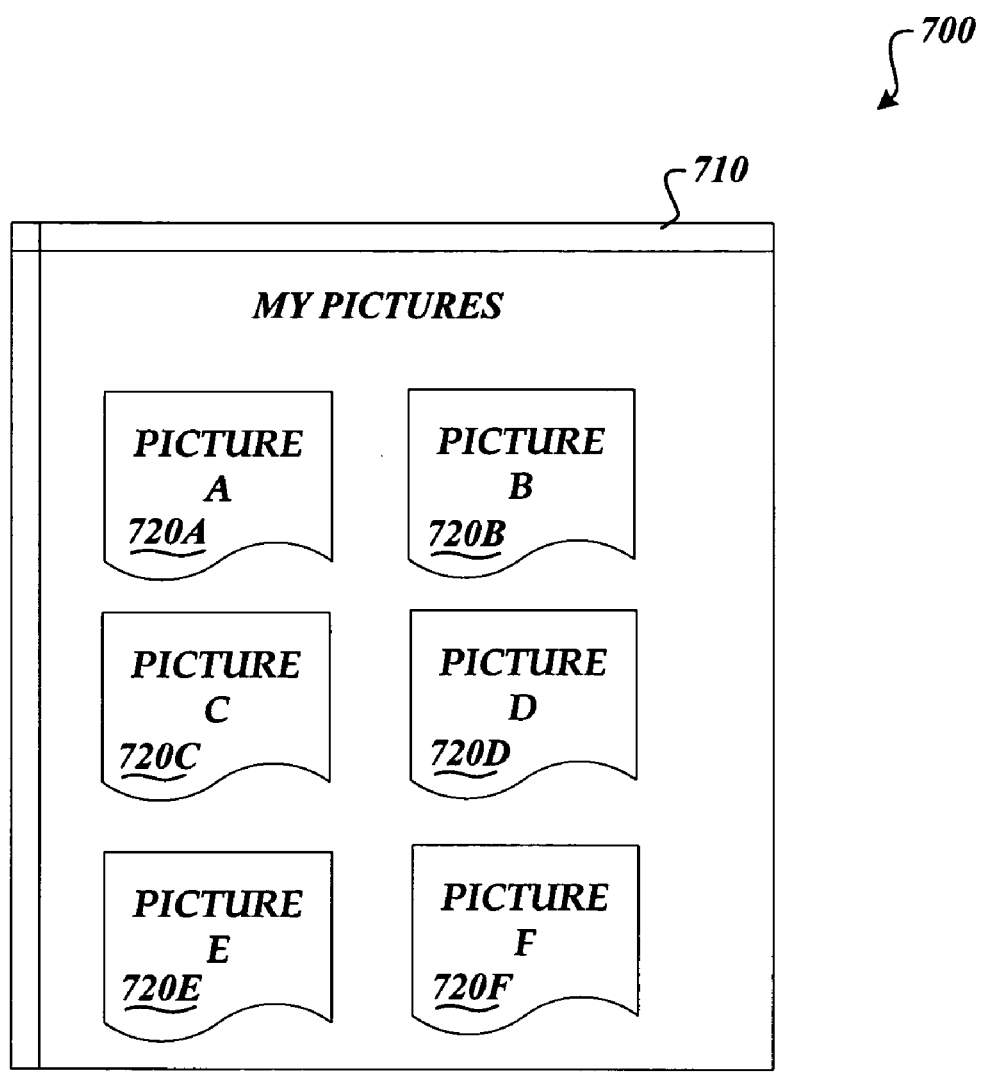
FIG. 7 is a depiction of a user interface containing a set of items that may be used in a static list, formed in accordance with the present invention.

FIG. 7 is a depiction of a user interface containing a set of items that may be used in a static list formed in accordance with the present invention. As shown, the set of items is for My Pictures 710, and contains six pictures—picture A 720A, picture B 720B, picture C 720C, picture D 720D, picture E 720E, and picture F 720F.

Figure 8:
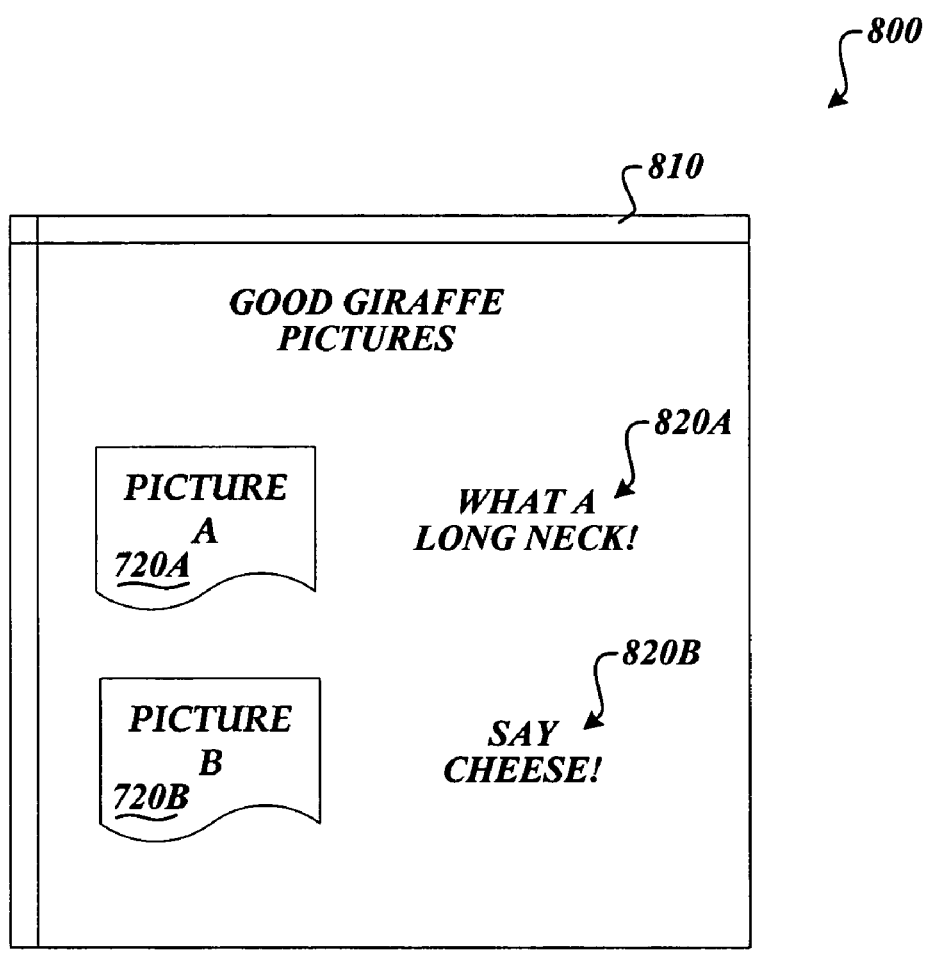
FIG. 8 is a depiction of a user interface displaying an exemplary static list containing items depicted in FIG. 7, as formed in accordance with the present invention.

FIG. 8 is a depiction of a user interface 800 displaying an exemplary static list 810 containing some of the items depicted in FIG. 7 as formed in accordance with the present invention. Using the exemplary static list described in FIG. 5, a static list labeled "good giraffe pictures" 810 is shown with two of the six pictures shown in FIG. 6, including picture A 720A and picture B 720B, corresponding to target items 520A and 520B (FIG. 5). The accompanying texts "what a long neck!" 820A and "say cheese!" 820B correspond to the comment properties 530A and 530B.

Figure 9:
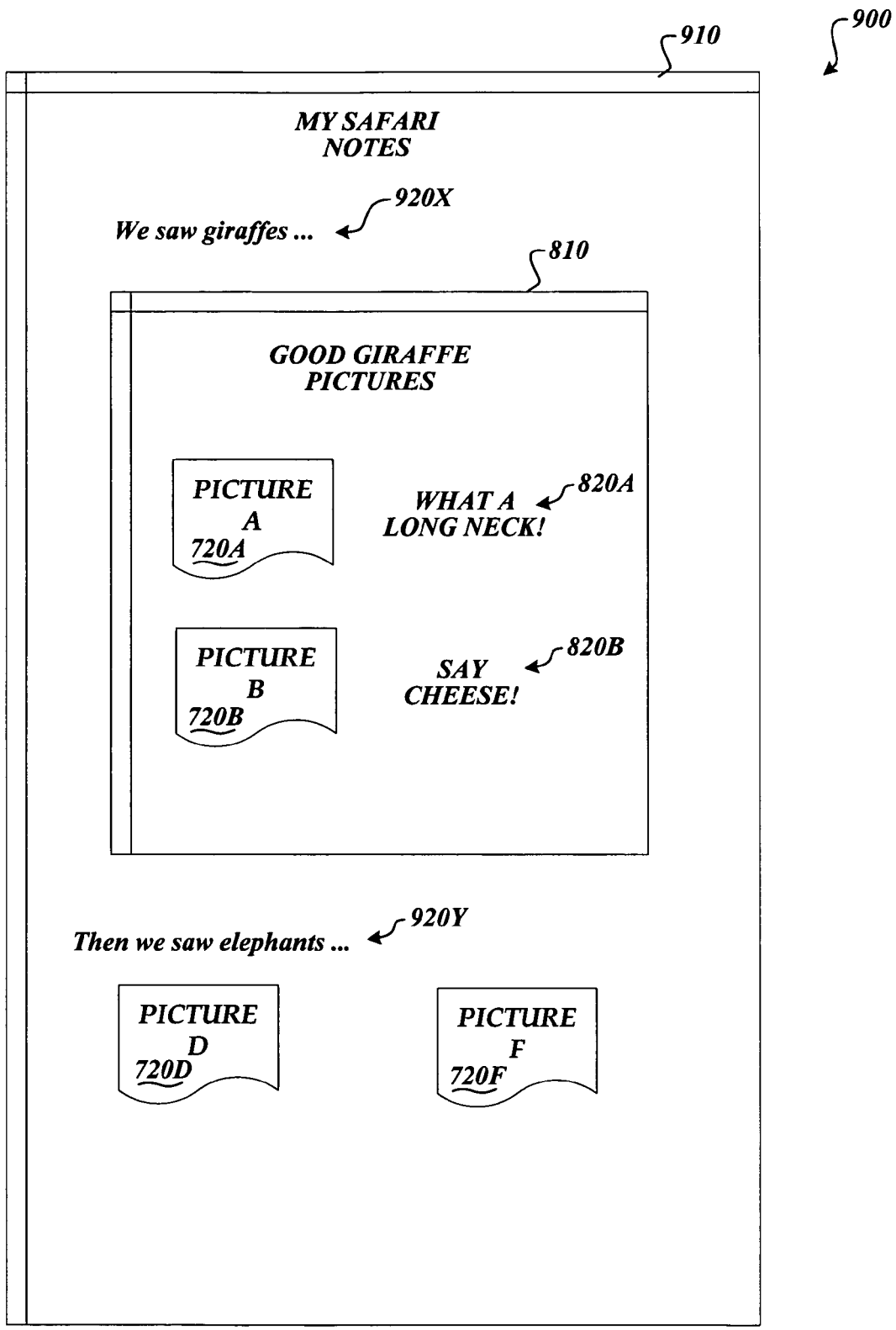
FIG. 9 is a depiction of a user interface displaying yet another exemplary static list that contains the exemplary static list depicted in FIG. 8, as formed in accordance with the present invention.

FIG. 9 is a depiction of a user interface 900 displaying yet another exemplary static list 910 that contains the exemplary static list 810 depicted in FIG. 8 as formed in accordance with the present invention. In addition, the static list 910 labeled "My Safari Notes" further contains texts "We saw giraffes . . . " 920X and "Then we saw elephants . . . " 920Y, which would correspond to properties 130 defined for the relationships 110 in static list 910, say, for example, a property 130 of note as defined by the entry template 340 for a root list item 320 for a safari journal. Here, the target items 150 are the pictures of the elephants—picture D 720D and picture F 720F—as well as the original static list 810 depicted in FIG. 8. This illustrates that static lists can have target items that are actually other static lists, i.e., that static lists can be nested.

Figure 10:
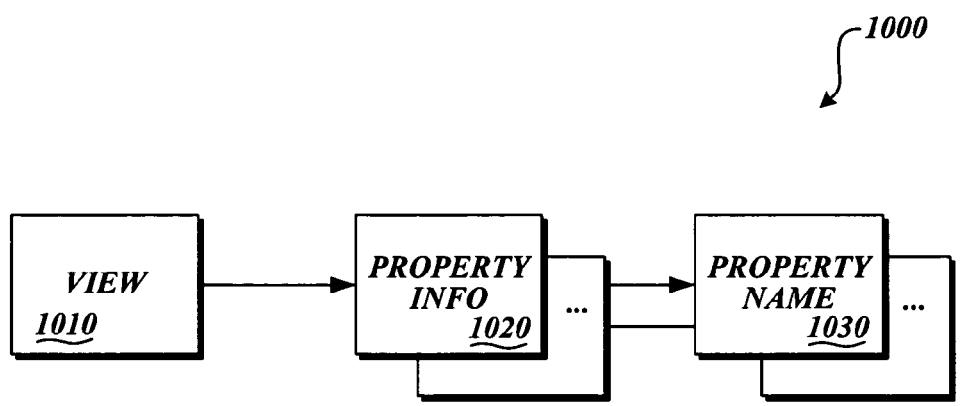
FIG. 10 is a depiction of further aspects of the conceptual storage model for defining a view that may be applied to a static list, formed in accordance with the present invention.

FIG. 10 is a depiction of further aspects of the conceptual storage model for defining a view that may be applied to a static list formed in accordance with the present invention. A view 1010 is a collection of property infos 1020. The property infos 1020 specify a property name 1030 of a property 130, and the display characteristics for the corresponding properties 130 that are defined for the items 150 and relationships 110 that comprise the static list 310. The view 1010 is applied to a static list 310 by retrieving the properties 130 by property names 1030 and applying the display characteristics to the values of the properties 130 in preparation for incorporating the values into a user interface to display the list to the user, such as the user interfaces illustrated in FIGS. 8 and 9.

Figure 11:
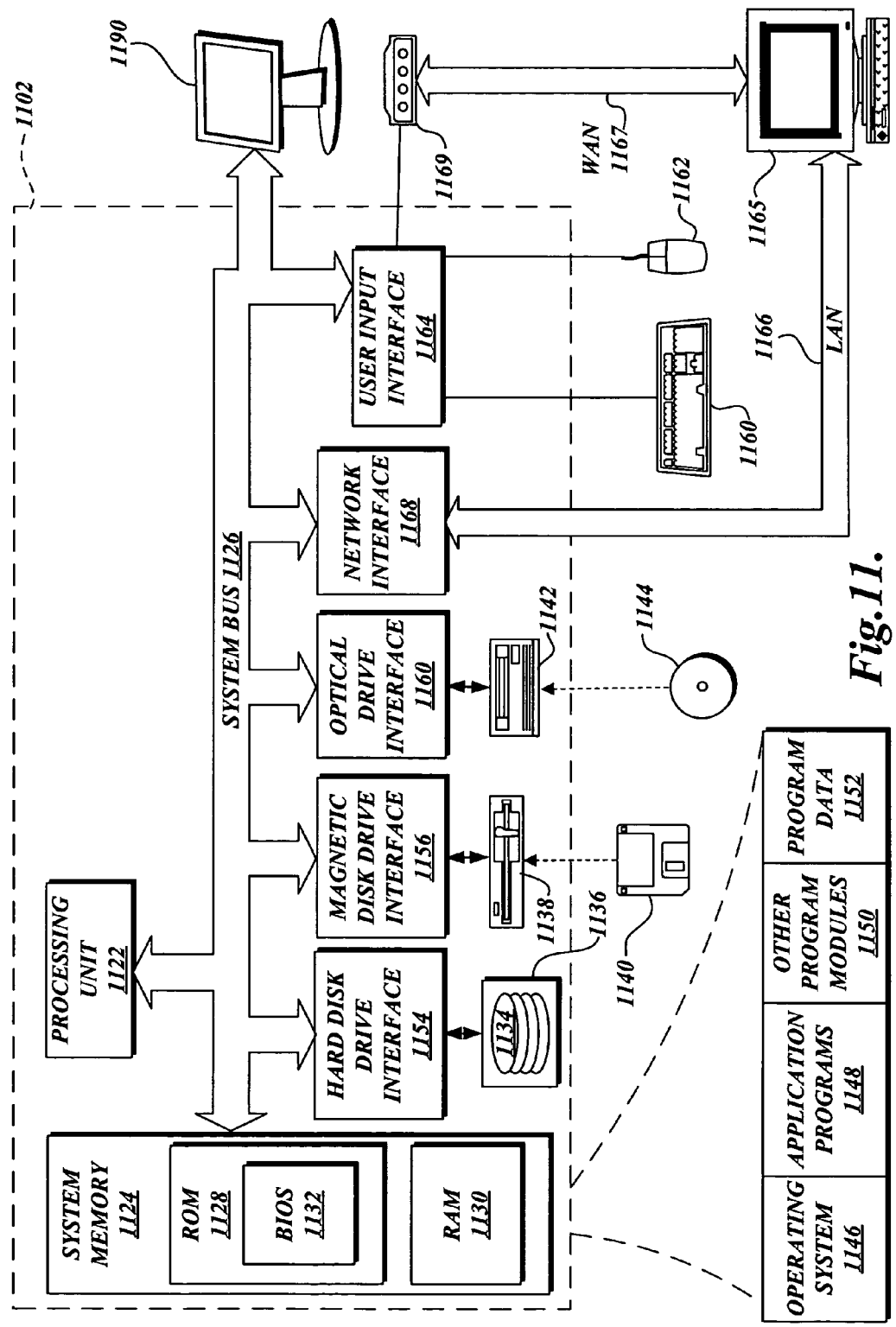
FIG. 11 is a block diagram of a general-purpose computer system suitable for containing static lists, formed in accordance with the present invention.

FIG. 11 is a block diagram of a general-purpose computer system suitable for containing static lists formed in accordance with the present invention. The system 1100 includes a personal computer 1102 comprising a processing unit 1122, a system memory 1124, and a system bus 1126 that couples the system memory to the processing unit 1122. The system memory 1124 includes read-only memory (ROM) 1128 and random-access memory (RAM) 1130. A basic input/output system 1132 (BIOS), containing the basic routines that help to transfer information between elements within the personal computer 1102, such as during startup, is stored in ROM 1128. The personal computer 1102 further includes a hard disk drive 1134, a magnetic disk drive 1138, e.g., to read from or write to a removable disk 1140, and an optical disk drive 1142, e.g., for reading a CD-ROM disk 1144 or to read from or write to other optical media. The hard disk drive 1134, magnetic disk drive 1138, and optical disk drive 1142 are connected to the system bus 1126 by a hard disk drive interface 1154, a magnetic disk drive interface 1156, and an optical drive interface 1160, respectively. The drives and their associated computer-readable media provide nonvolatile storage for the personal computer 1102. Although the description of computer-readable media above refers to a hard disk, a removable magnetic disk, and a CD-ROM disk, it should be appreciated by those skilled in the art that other types of media that are readable by a computer, such as magnetic cassettes, flash memory cards, digital video disks, Bernoulli cartridges, ZIP disks, and the like may also be used in the exemplary operating environment.

A number of program modules may be stored in the drives and RAM 1130, including an operating system 1146, one or more application programs 1148, other program modules 1150, such as the extensions and interfaces of the present invention, and program data 1152, including the command item and insert location data of the present invention. A user may enter commands and information into the personal computer 1102 through input devices such as a keyboard 1160 or a mouse 1162. Other input devices (not shown) may include a microphone, touch pad, joystick, game pad, satellite dish, scanner, or the like. These and other input devices are often connected to the processing unit 1122 through a user input interface 1164 that is coupled to the system bus, but may be connected by other interfaces (not shown), such as a game port or a universal serial bus (USB). A display device 1190 is also connected to the system bus 1126 via a display subsystem that typically includes a graphics display interface (not shown) and a code module, sometimes referred to as a display driver, to interface with the graphics display interface. While illustrated as a stand-alone device, the display device 1190 could be integrated into the housing of the personal computer 1102. Furthermore, in other computing systems suitable for implementing the invention, such as a PDA, the display could be overlaid with a touch-screen. In addition to the elements illustrated in FIG. 11, client devices also typically include other peripheral output devices (not shown), such as speakers or printers.

The personal computer 1102 may operate in a networked environment using logical connections to one or more remote computers, such as a remote computer 1165. The remote computer 1165 may be a server, a router, a peer device, or other common network node, and typically includes many or all of the elements described relative to the personal computer 1102. The logical connections depicted in FIG. 11 include a local area network (LAN) 1166 and a wide area network (WAN) 1167. The LAN 1166 and WAN 1167 may be wired, wireless, or a combination thereof. Such networking environments are commonplace in offices, enterprise-wide computer networks, Intranets, and the Internet.

When used in a LAN networking environment, the personal computer 1102 is connected to the LAN 1166 through a network interface 1168. When used in a WAN networking environment, the personal computer 1102 typically includes a modem 1169 or other means for establishing communications over the WAN 1167, such as the Internet. The modem 1169, which may be internal or external, is connected to the system bus 1126 via the user input interface 1164. In a networked environment, program modules depicted relative to the personal computer 1102, or portions thereof, may be stored in the remote memory storage device. It will be appreciated that the network connections shown are exemplary and other means of establishing a communication link between the computers may be used. In addition, the LAN 1166 and WAN 1167 may be used as a source of nonvolatile storage for the system.

Figure 12:
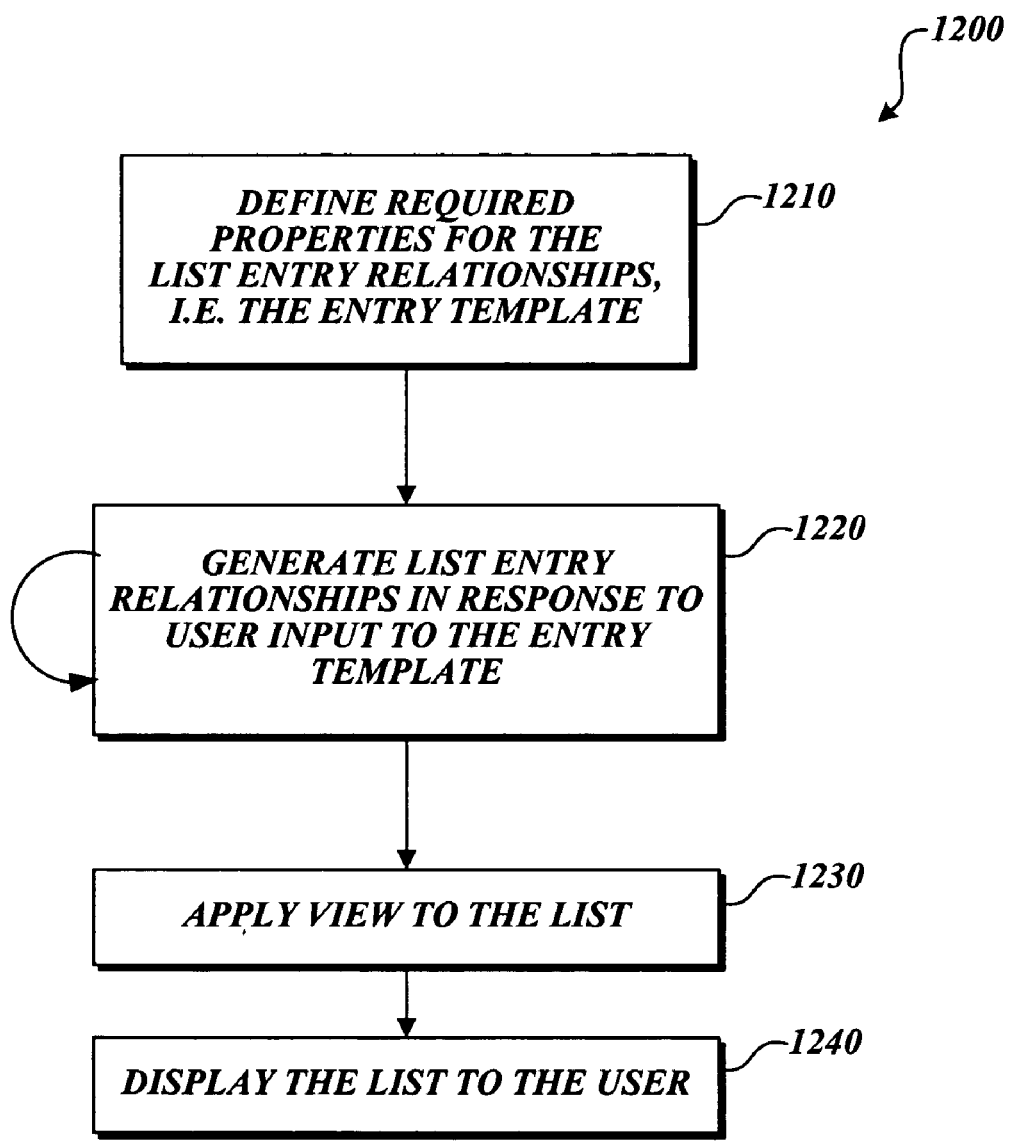
FIG. 12 is a flow diagram illustrating the logic performed by a general-purpose computer system for managing data using static lists, formed in accordance with the present invention.

FIG. 12 is a flow diagram illustrating the logic performed by a general-purpose computer system for managing data using static lists formed in accordance with the present invention. At processing block 1210, the user further defines which properties he or she wishes to require for each list entry relationship, i.e., the list entry template. Again, using the same example, the list entry relationship is defined to have at least two properties that describe the comment associated with the target pictures as well as a rating. At processing block 1220, a processor uses the definitions to generate a static list, including generating the list entry relationships in response to user input to the entry template. For example, depending on the type of graphical user interface employed in the embodiment, the user might drag and drop the arbitrarily selected target pictures (here, picture A 520A/720A and picture B 520B/720B) from the user interface 710 depicted in FIG. 7 into the user interface 810 depicted in FIG. 8. This user action will trigger generation of the list entry relationships in the static list in accordance with the list entry template 340 (FIG. 3 and FIG. 5).

In one embodiment, processing continues at process block 1230, where the user can elect to apply a previously defined View 1010 to the list in order to display, at process block 1240, the list contents in a user interface such as the user interface 810 depicted in FIG. 8.

Figure 13:
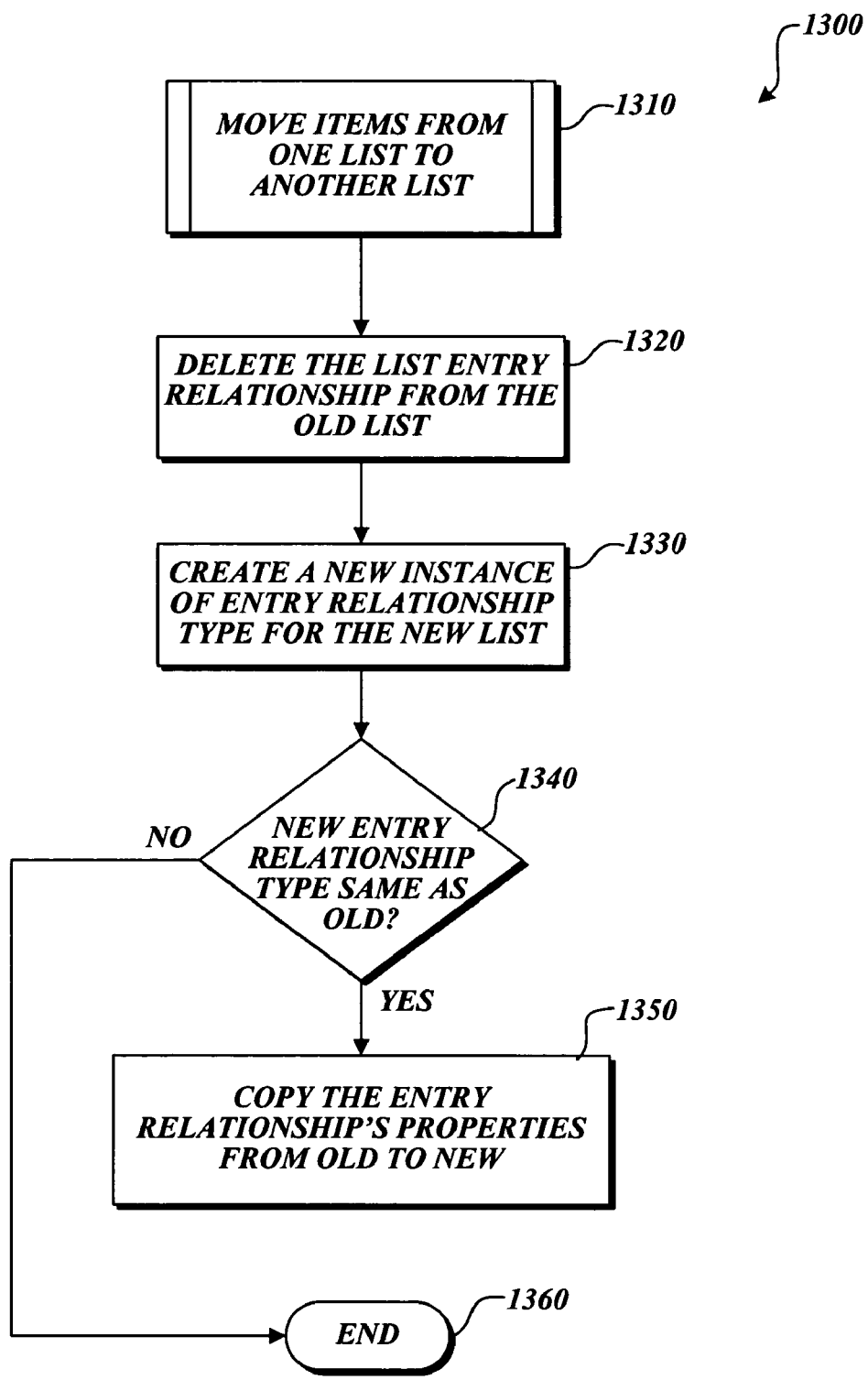
FIG. 13 is a flow diagram illustrating the logic performed by a general-purpose computer system for moving items between static lists, formed in accordance with the present invention.

FIG. 13 is a flow diagram illustrating the logic performed by a general-purpose computer system for moving items between static lists formed in accordance with the present invention. The process begins at predefined process block 1310 invoked in response to a user input to move an item from one static list to another. Processing begins at process block 1320, where a processor deletes the list entry relationship associated with the selected item from the current static list. At processing block 1330, the processor creates a new instance of an entry relationship type for the new list. At decision block 1340, the process determines whether the type of entry relationship being created is the same as the type of entry relationship just deleted from the old list. If yes, the processing continues at process block 1350, where the processor copies the entry relationship's properties from old to new. So, for example, if the type of entry relationship is denoted as good giraffe pictures, then the same properties of comments and ratings will be copied to the new list.

Figure 14:
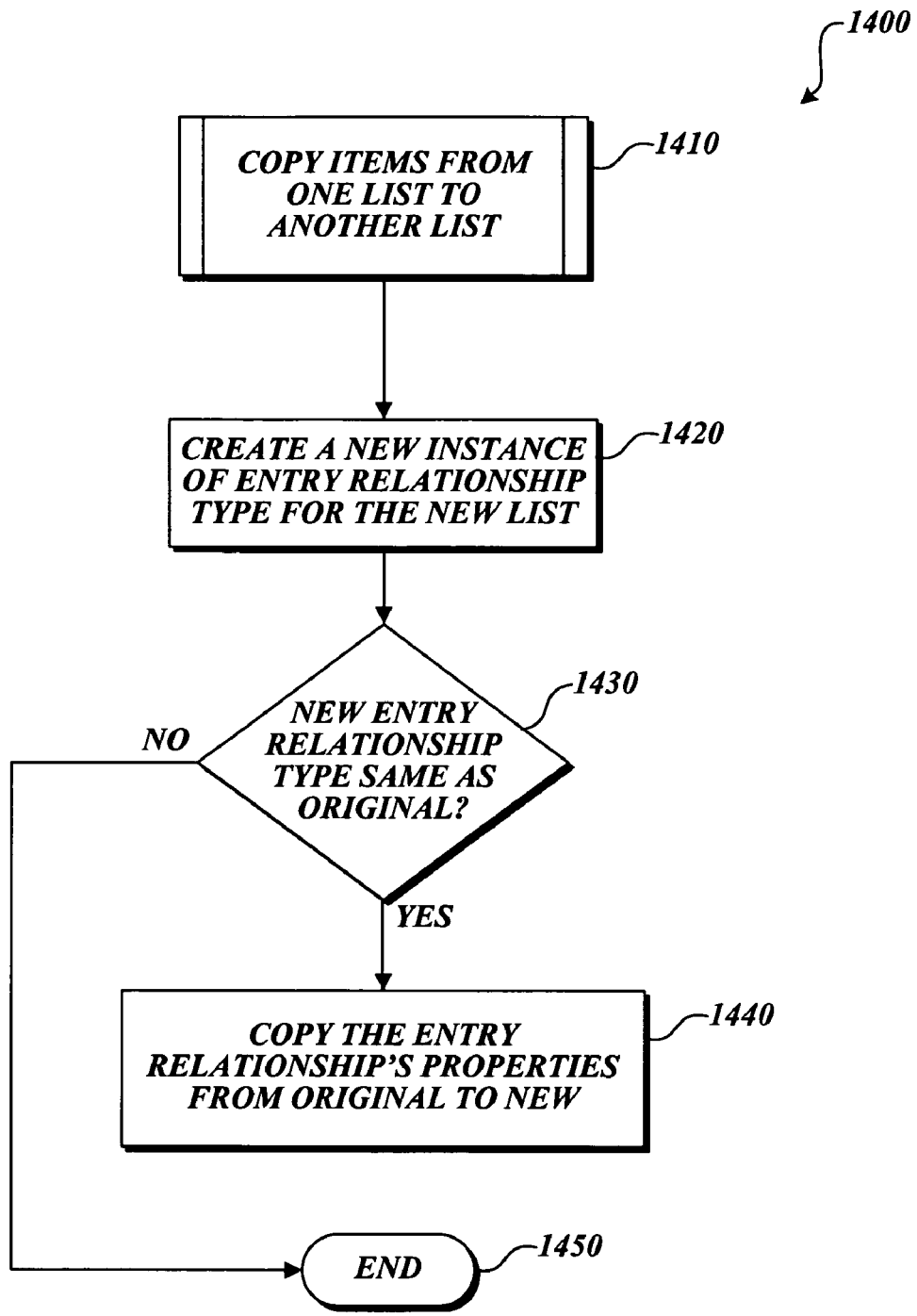
FIG. 14 is a flow diagram illustrating the logic performed by a general-purpose computer system for copying items between static lists, formed in accordance with the present invention.

FIG. 14 is a flow diagram illustrating the logic performed by a general-purpose computer system for copying items between static lists formed in accordance with the present invention. The process begins at predefined process block 1410 invoked in response to a user input to copy an item from one static list to another. Similar to the move logic described in reference to FIG. 13, at processing block 1420, the processor creates a new instance of an entry relationship type for the new list. At decision block 1430, the process determines whether the type of entry relationship being created is the same as the type of entry relationship defined in the original list. If yes, the processing continues at process block 1440, where the processor copies the entry relationship's properties from original to new.

Figure 15:
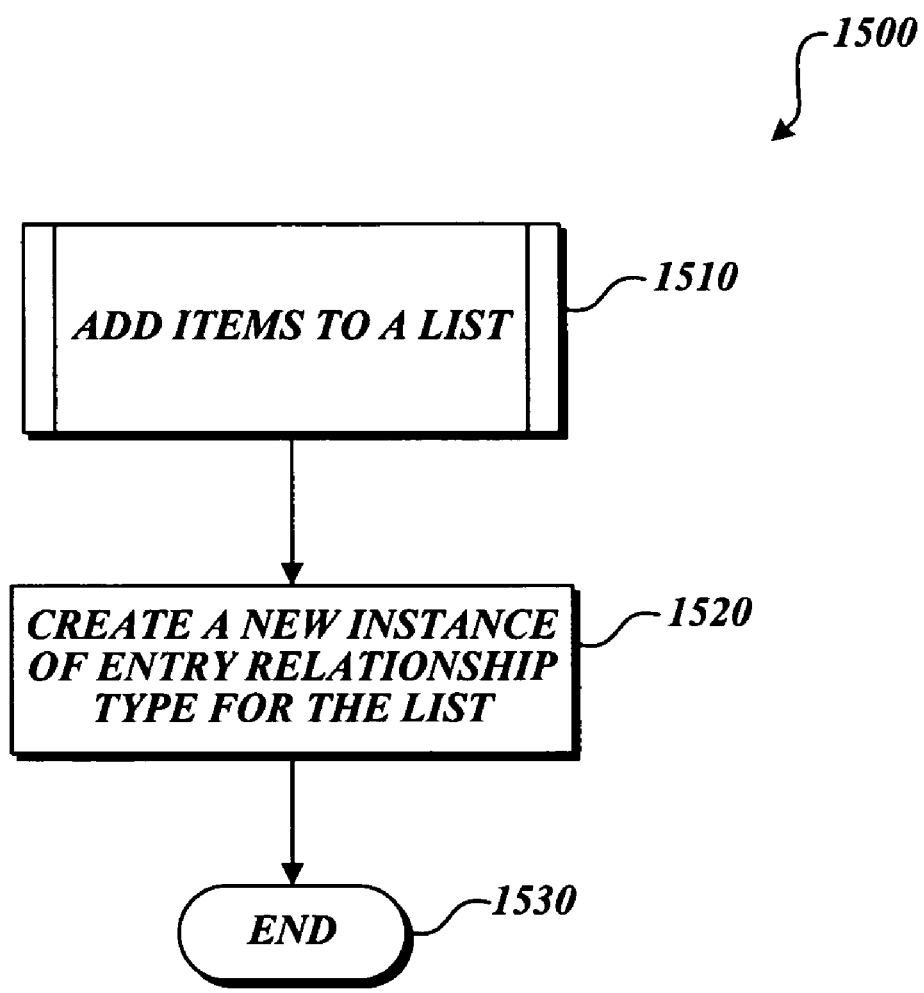
FIG. 15 is a flow diagram illustrating the logic performed by a general-purpose computer system for adding items to static lists, formed in accordance with the present invention.

FIG. 15 is a flow diagram illustrating the logic performed by a general-purpose computer system for adding items to static lists formed in accordance with the present invention. The process begins at predefined process block 1510 invoked in response to a user input to add an item to a static list. At processing block 1520, the processor creates a new instance of an entry relationship type for the list.

Figure 16:
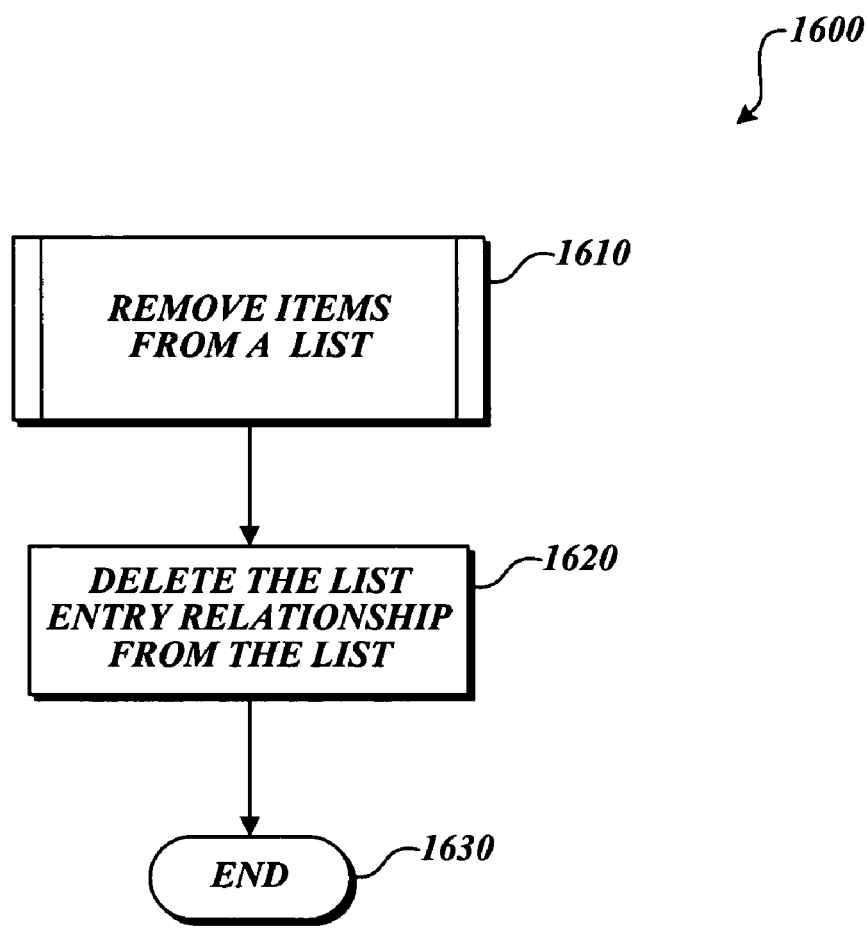
FIG. 16 is a flow diagram illustrating the logic performed by a general-purpose computer system for removing items from static lists, formed in accordance with the present invention.

FIG. 16 is a flow diagram illustrating the logic performed by a general-purpose computer system for removing items from static lists formed in accordance with the present invention. The process begins at predefined process block 1610 invoked in response to a user input to remove an item from a static list. At processing block 1620, the processor deletes the list entry relationship from the list.

Figure 17:
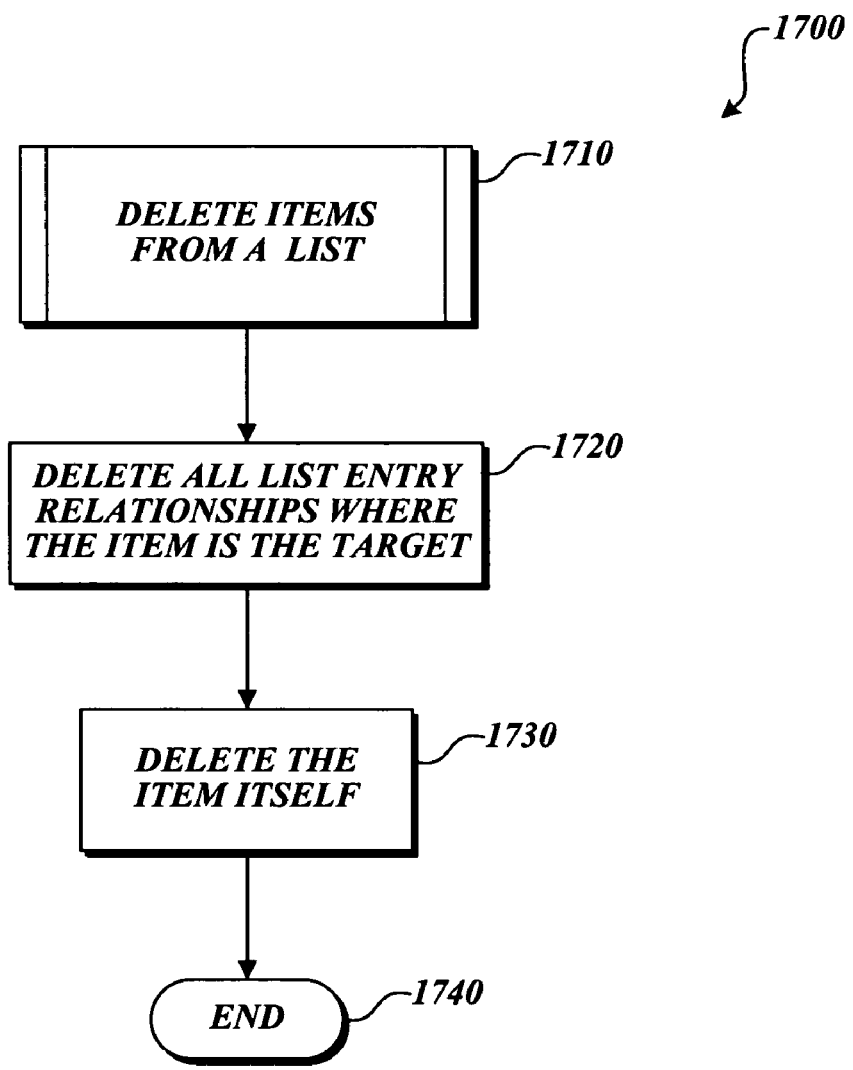
FIG. 17 is a flow diagram illustrating the logic performed by a general-purpose computer system for deleting items from static lists, formed in accordance with the present invention.

FIG. 17 is a flow diagram illustrating the logic performed by a general-purpose computer system for deleting items from static lists formed in accordance with the present invention. The process begins at predefined process block 1710 invoked in response to a user input to delete an item from a static list. At processing block 1720, the processor first determines all of the list entry relationships that exist where the deleting item is the target. Once completed, the processor deletes all list entry relationships from the list where the list item is the target item 104. At processing block 1730, the processor deletes the item itself.

Figure 18:
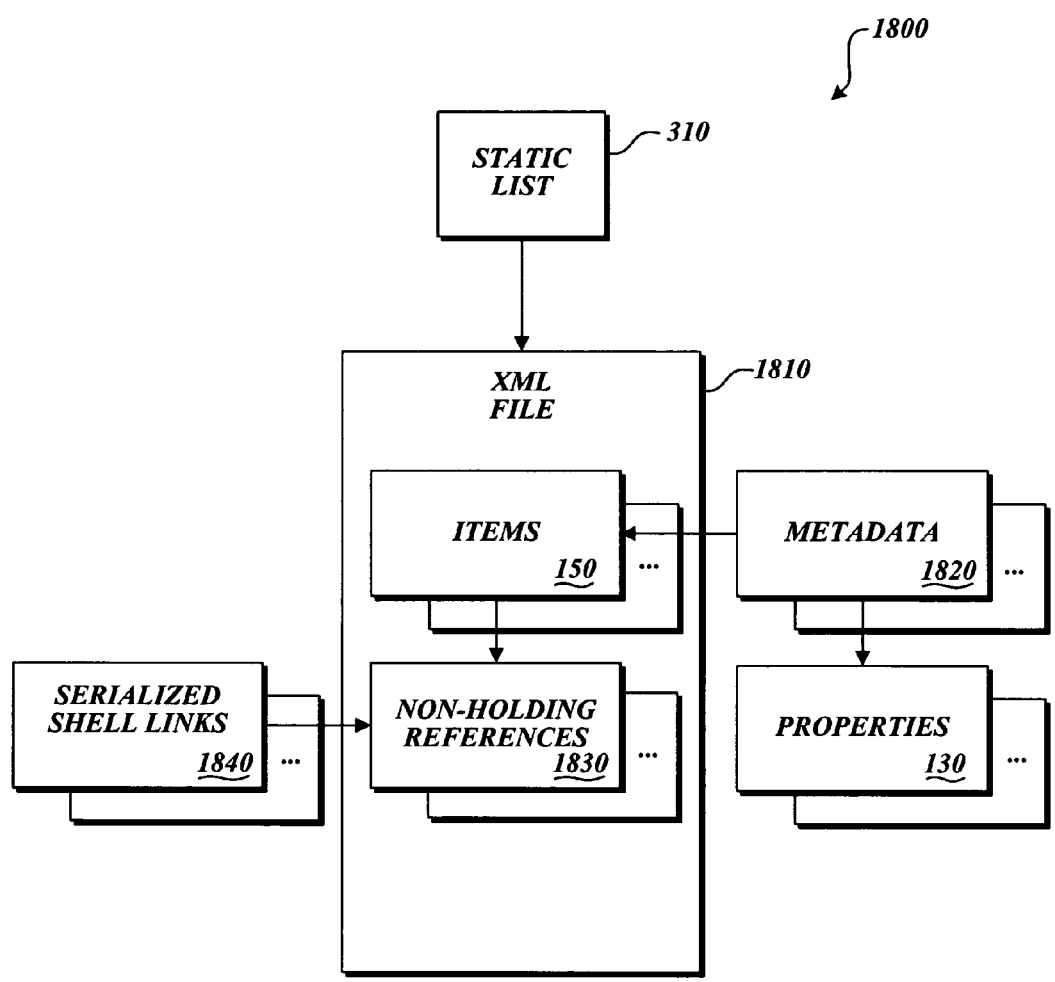
FIG. 18 is a block diagram overview of an implementation of static lists formed in accordance with the present invention using XML files.

FIG. 18 is a block diagram overview of an implementation of static lists formed in accordance with the present invention using XML files. In a processing system 1102 (FIG. 11) that uses a conventional file system, it may be preferable to implement static lists using an XML file 1810 to represent the non-holding references 1830 to the items 150 within the list 310. The non-holding references 1830 are those references that cannot be dynamically resolved should the item itself change location or be deleted. The XML file 1810 permits the processing system 1102 to advantageously serialize the links to the referenced items in the form of shell link data 1840. The shell link data 1840 is used in favor of any absolute path referring to the item 150 as it contains a persisted moniker to the referenced item. The shell link data 1840 also includes hints that permit the processing system 1102 to resolve the reference 1830 in cases where the target item has been moved. For example, the hints may include such things as item creation date and various forms of the file system path.

The XML file 1810 further permits the processing system 1102 to store and track user-defined arbitrary metadata 1820 to represent the properties 130 of the items 150 and the relationships 110. In such an implementation, the properties 130 are identified by their assigned globally unique identification (GUID) plus the property identification, also referred to in the Windows® operating system as the PROPERTYKEY. The metadata 1820 may also be advantageously employed to propagate certain security features for the static list to the referenced items 150.

Figure 19:
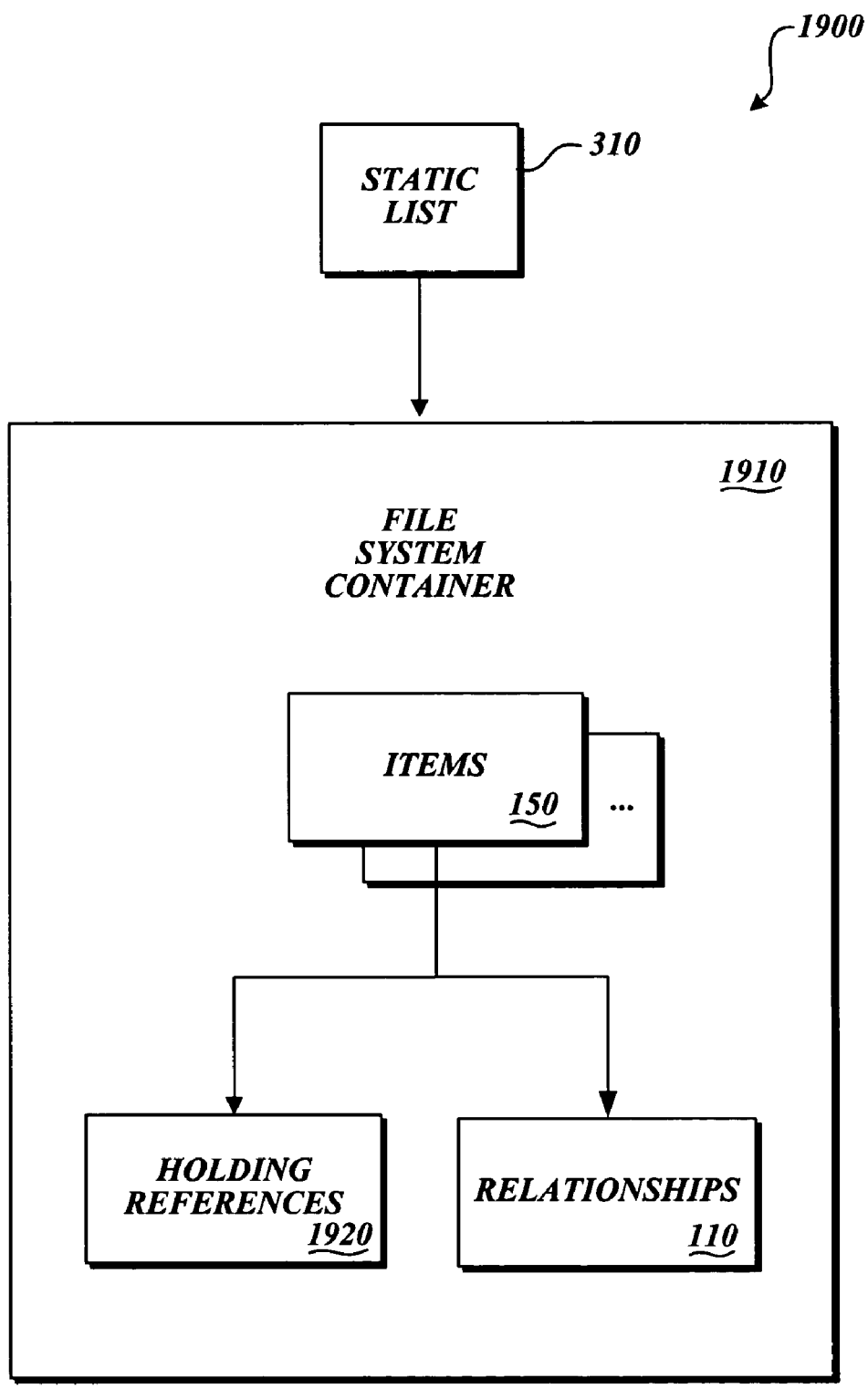
FIG. 19 is a block diagram overview of an implementation of static lists, formed in accordance with the present invention, using file system containers.

FIG. 19 is a block diagram overview of an implementation 1900 of static lists formed in accordance with the present invention using file system containers. In a processing system 1102 (FIG. 11) employing a more advanced file system to manage data using a relational database, it is preferable to model the static list 320 as a file system container 1910. A file system container 1910 is a file object that includes holding references 1920 to items 150 as well as the relationships 110 between the items, depending on whether the referenced items are stored on the same volume as the container 1910.

In an example scenario, a user wants to produce a list of documents used to give presentations to clients about his company's new product, a brake pad. The documents include various Word® documents that describe the brake pad technology in depth, a PowerPoint® presentation, pictures of the brake pads, and even some video files shown the brake pads in action using an infrared camera. The user gives the presentation to different clients having different needs, cares, and wants. As a result, the user wishes to customize the presentation. Using static lists, the user can create different static lists, each with references to the same items, but in a different order (to tune the presentation to the audience). The user can also include different important properties. For example, for one client the sales price on all items is shown in the clear (and may even be specific to a client), whereas for other clients, the sales price is masked. In yet another example, the user may include properties that reveal the latest details of guarantees and awards they have won.

In the example scenario, the static lists are maintained automatically. When the user deletes one of the documents from one of the lists, the document is still available in all of the other lists where it is referenced. On the other hand, when the user deletes one of the documents from the folder where it resides, all lists referencing that document are updated to remove the reference so that the reference does not display as a dead link.

As a result of the foregoing, the user can advantageously create an unlimited number of static lists customized for a particular audience, and yet avoid the hassles of managing all of the references in those lists.

While the presently preferred embodiments of the invention have been illustrated and described, it will be appreciated that various changes may be made therein without departing from the spirit and scope of the invention. For example, it should be noted that either of the above-described implementations may be employed on a processing system 1102 regardless of what type of file system is employed. It may be advantageous to represent a static list as an XML file 1810, even on processing systems 1102 capable of using containers 1910, where interoperability with systems using more conventional file systems is desired. Moreover, in other embodiments, regardless of the type of file system employed, the items in the static list may be presented to the user using any user interface, including in a folder of the Windows® Shell user interface. As various operations are performed on the static list or the items in the list, the operations are either handled by the folder or delegated to a target of the referenced item, i.e., the target item.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for managing data in a list, the method comprising:
    creating a list having an item type and a relationship type, wherein the relationship type corresponds to a relationship between items in the list;
    generating a list entry template based on the relationship type, wherein the list entry template includes one or more item properties associated with the relationship type;
    generating a list entry, in accordance with the entry template, representing the relationship between an item and a root list item, wherein the list entry comprises the one or more item properties specified by the list entry template;
    adding the generated list entry to the created list;
    storing the list in a memory of a data processing device;
    changing a location of the item;
    updating the entry to refer to the changed location; and
    displaying information based on the created list.

2. The computer-implemented method of claim 1, further comprising generating a value for the one or more item properties of the list entry.

3. The computer-implemented method of claim 2, further comprising moving the item to a new list, wherein moving includes deleting the entry from the original list and generating an entry in the new list and copying the value for any property that the new list's relationship type has in common with the original list's relationship type.

4. The computer-implemented method of claim 3, further comprising copying the item to a new list, wherein copying includes generating an entry in the new list and copying the value for any property that the new list's relationship type has in common with the original list's relationship type.

5. The computer-implemented method of claim 1, the method further comprising deleting an item, wherein deleting includes removing the entry from the list and removing any other entry in other lists, where the other entry also represents an association with the item.

6. The computer-implemented method of claim 1, the method further comprising applying a view to the list, wherein applying the view includes retrieving entries in the list having properties that match properties specified in the view and applying a display characteristic to the values of the matching properties.

7. The computer-implemented method of claim 1, wherein the list is a file in XML format, wherein the entry is a non-holding reference to the item associated with the item type and the property is a metadata associated with the item, and updating the entry includes serializing a shell link to the reference.

8. The computer-implemented method of claim 1, wherein the list is a file system container, and the entry is a holding reference to an item, the holding reference reflecting a current status of the item.

9. A system for managing data, the system comprising:
    a storage medium for storing items of data and a list entry template, wherein the list entry template is generated based on a relationship type of a list of selected items, wherein the relationship type corresponds to a relationship between items in the list of selected items;
    a processing unit for operating a process to generate the list of selected items in response to a user input, wherein each entry of the generated list of selected items is generated in accordance with the list entry template and represents a reference to the item independent of the item's location in the storage medium, and wherein each entry of the generated list of selected items includes a property value generated in accordance with the list entry template, wherein the process to generate the list of selected items includes a process to update an entry of the generated list to refer to a new location upon the stored items of data being moved to the new location; and
    a display unit for displaying a view of the items in the list, the view including a display of the property values of the entry in accordance with a display characteristic.

10. The system of claim 9, wherein the process to update the entry includes removing the entry from the list when the item is no longer stored on the storage medium.

11. The system of claim 10, wherein the process to generate the list includes a process to move the item to a new list including the process to copy the item to the new list plus a process to delete the entry from the original list.

12. The system of claim 9, wherein the process to generate the list includes a process to copy the item to a new list comprising making an entry in the new list and copying the property value from the original entry to the new entry in accordance with the new list's entry template.

13. The system of claim 9, wherein the processing unit is to further operate a process to delete an item from the storage medium that includes removing all entries that refer to the item.

14. The system of claim 9, wherein the generated list is a file in XML format, and wherein the entry in the list is a non-holding reference to the item and the property is a metadata associated with the item, and updating the entry includes serializing a shell link to the reference.

15. The system of claim 9, wherein the generated list is a file system container, and the entry is a holding reference to the item, the holding reference referring to a current location of the item.

16. A computer-accessible medium having a computer-executable component for:
   defining a first list having an item type and a relationship type;
   generating a list entry template based on the relationship type of the first list, wherein the list entry template includes one or more item properties specified by the relationship type;
   generating a list entry, in accordance with the list entry template, representing an association between an item and the item type, wherein the list entry comprises the one or more item properties of the list entry template;
   adding the list entry to the first list;
   updating the entry whenever a status of the item changes; and
   moving the item to a second list, wherein moving includes deleting the entry from the first list and generating an entry in the second list and copying the value for any property that the second list's relationship type has in common with the first list's relationship type.

17. The computer accessible medium of claim 16, wherein the computer executable component updates the entry to refer to a current location of the item, regardless of an actual location of the item.

18. The computer accessible medium of claim 16, wherein the computer executable component automatically removes the entry from the first list when the item is deleted.

19. The computer accessible medium of claim 16, wherein the computer-executable component further defines for the one or more item properties specified by the relationship type, wherein generating a list entry includes generating a value for the one or more item properties.

20. The computer accessible medium of claim 16, wherein the computer-executable component further applies a view to the first list, wherein applying the view includes retrieving entries in the first list having properties that match properties specified in the view and applying a display characteristic to the values of the matching properties.

21. The computer accessible medium of claim 16, wherein the first list is stored in XML format, wherein the entry is a non-holding reference to the item associated with the item type and the property is a metadata associated with the item, and updating the entry includes serializing a shell link to the reference.

22. The computer accessible medium of claim 16, wherein the first list is stored in a file system container, and the entry is a holding reference to an item, the holding reference reflecting a current status of the item.

23. A computer-implemented method for managing data in a list, the method comprising:
   creating a list having an item type and a relationship type, wherein the relationship type corresponds to a relationship between items in the list; and wherein the list is a file in XML format;
   generating a list entry template based on the relationship type, wherein the list entry template includes one or more item properties associated with the relationship type;
   generating a list entry, in accordance with the entry template, representing the relationship between an item and a root list item,
   wherein the list entry comprises the one or more item properties specified by the list entry template, wherein the one or more item properties is metadata associated with the item, and
   wherein the list entry is a non-holding reference to the item associated with the item type;
   adding the generated list entry to the created list;
   storing the list in a memory of a data processing device;
   updating the generated list entry, wherein updating the generated list entry includes serializing a shell link to the non-holding reference; and
   displaying information based on the created list.

* * * * *